United States Patent
Zeine

(10) Patent No.: US 11,131,745 B2
(45) Date of Patent: Sep. 28, 2021

(54) TECHNIQUES FOR IMAGING WIRELESS POWER DELIVERY ENVIRONMENTS AND TRACKING OBJECTS THEREIN

(71) Applicant: Ossia Inc., Bellevue, WA (US)

(72) Inventor: Hatem Ibrahim Zeine, Bellevue, WA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 16/871,229

(22) Filed: May 11, 2020

(65) Prior Publication Data

US 2021/0063525 A1 Mar. 4, 2021

Related U.S. Application Data

(63) Continuation of application No. 15/977,704, filed on May 11, 2018, now Pat. No. 10,649,063, which is a
(Continued)

(51) Int. Cl.

| | |
|---|---|
| G01S 5/02 | (2010.01) |
| H02J 5/00 | (2016.01) |
| G01S 5/06 | (2006.01) |
| H04W 4/029 | (2018.01) |
| H02J 50/90 | (2016.01) |
| H02J 50/40 | (2016.01) |

(Continued)

(52) U.S. Cl.
CPC .............. *G01S 5/0294* (2013.01); *G01S 5/06* (2013.01); *H02J 5/005* (2013.01); *H02J 7/025* (2013.01); *H02J 50/20* (2016.02); *H02J 50/40* (2016.02); *H02J 50/60* (2016.02); *H02J 50/90* (2016.02); *H04W 4/029* (2018.02); *H04W 4/30* (2018.02); *H04W 4/33* (2018.02)

(58) Field of Classification Search
None
See application file for complete search history.

(56) References Cited

U.S. PATENT DOCUMENTS

| | | |
|---|---|---|
| 5,982,103 A | 11/1999 | Mosebrook et al. |
| 6,178,140 B1 | 1/2001 | Schlieter |
| | (Continued) | |

FOREIGN PATENT DOCUMENTS

| | | |
|---|---|---|
| EP | 2730938 | 5/2014 |
| JP | 2005-345198 A | 12/2005 |
| | (Continued) | |

OTHER PUBLICATIONS

European Patent Application No. 16777072.6, Extended European Search Report, 10 pages, dated Jan. 3, 2019.
(Continued)

*Primary Examiner* — Jared Fureman
*Assistant Examiner* — Joel Barnett

(57) ABSTRACT

Techniques are described herein for imaging static or semi-static objects in a wireless power delivery environment and tracking non-static objects contained therein. More specifically, embodiments of the present disclosure describe techniques for determining the relative locations and movement of non-static objects in a wireless power delivery environment. Additionally, the techniques describe methods and systems for generation of motion-based maps such as heat (or dwell) maps and flow maps.

20 Claims, 19 Drawing Sheets

Related U.S. Application Data continuation of application No. 14/945,741, filed on Nov. 19, 2015, now Pat. No. 9,971,015.

(60) Provisional application No. 62/146,233, filed on Apr. 10, 2015.

(51) Int. Cl.
| | | |
|---|---|---|
| *H02J 7/02* | (2016.01) | |
| *H02J 50/20* | (2016.01) | |
| *H02J 50/60* | (2016.01) | |
| *H04W 4/30* | (2018.01) | |
| *H04W 4/33* | (2018.01) | |

(56) References Cited

U.S. PATENT DOCUMENTS

| | | |
|---|---|---|
| 6,448,490 B1 | 9/2002 | Katz |
| 8,072,380 B2 | 12/2011 | Crouch |
| 8,310,201 B1 | 11/2012 | Wright |
| 2003/0153266 A1 | 8/2003 | Kim et al. |
| 2003/0220092 A1 | 11/2003 | Hethuin et al. |
| 2005/0136845 A1 | 6/2005 | Masuoka et al. |
| 2007/0008132 A1 | 1/2007 | Bellantoni |
| 2008/0217309 A1 | 9/2008 | Rodgers |
| 2009/0168088 A1 | 7/2009 | Rosenblatt |
| 2010/0041349 A1 | 2/2010 | Mahany et al. |
| 2010/0178919 A1 | 7/2010 | Deepak et al. |
| 2010/0328073 A1* | 12/2010 | Nikitin ............... G01S 5/12 340/572.1 |
| 2011/0043163 A1 | 2/2011 | Baarman |
| 2011/0103517 A1 | 5/2011 | Hamalainen |
| 2012/0249051 A1 | 10/2012 | Son et al. |
| 2012/0262004 A1 | 10/2012 | Cook et al. |
| 2012/0274154 A1 | 11/2012 | DeLuca |
| 2012/0276854 A1 | 11/2012 | Joshi et al. |
| 2012/0302297 A1 | 11/2012 | Patel et al. |
| 2012/0326660 A1* | 12/2012 | Lu ................... H02J 50/005 320/108 |
| 2013/0026981 A1 | 1/2013 | Van Der Lee |
| 2013/0063567 A1 | 3/2013 | Burns et al. |
| 2013/0106661 A1 | 5/2013 | Xiang |
| 2013/0154892 A1 | 6/2013 | Zeltser et al. |
| 2013/0273870 A1 | 10/2013 | Shi |
| 2014/0091626 A1 | 4/2014 | Walley et al. |
| 2014/0117928 A1 | 5/2014 | Liao |
| 2014/0217967 A1 | 8/2014 | Zeine et al. |
| 2014/0268519 A1 | 9/2014 | Huang et al. |
| 2014/0300202 A1* | 10/2014 | Shimokawa ........... H02J 50/90 307/104 |
| 2014/0302869 A1 | 10/2014 | Rosenbaum et al. |
| 2014/0361735 A1 | 12/2014 | Li et al. |
| 2015/0022022 A1 | 1/2015 | Zeine |
| 2015/0061509 A1 | 3/2015 | Karlicek et al. |

FOREIGN PATENT DOCUMENTS

| | | |
|---|---|---|
| WO | 2010/038359 A1 | 4/2010 |
| WO | 2013/142720 A1 | 9/2013 |

OTHER PUBLICATIONS

Japanese Patent Application No. 2017-552035, Office Action, 11 pages, dated Sep. 11, 2018.

Japanese Patent Application No. 2017-552035, Office Action, 11 pages, dated Jun. 25, 2019.

Yuma Nibe et al., LRF to Kinect wo tougoushita hito no taikankiseki oyobi chakuza, chiijouhou no chizukashuhou, 30th Annual Conference of The Robotics Society of Japan, 4 pages, Sep. 27, 2012.

Extended European Search Report for EP Application No. 20172979. 5; dated Jul. 2, 2020; 10 pages.

* cited by examiner

TECHNIQUES FOR IMAGING WIRELESS POWER DELIVERY ENVIRONMENTS AND TRACKING OBJECTS THEREIN

CROSS-REFERENCE TO RELATED APPLICATIONS

This application is a continuation of U.S. patent application Ser. No. 15/977,704 filed on May 11, 2018, and issued as U.S. Pat. No. 10,649,063 on May 11, 2020; which is a continuation of U.S. patent application Ser. No. 14/945,741 filed on Nov. 19, 2015, and issued as U.S. Pat. No. 9,971,015 on May 15, 2018; which claims priority to and benefit from U.S. Provisional Patent Application No. 62/146,233 filed on Apr. 10, 2015, each of which is expressly incorporated by reference herein in their entireties.

BACKGROUND

Location determination systems, such as the global positioning system (GPS), have provided the ability to identify and track locations and movement of devices. Although fairly accurate outdoors, many location determination systems cannot detect when a device is indoors. Solutions have been proposed for locating devices indoors involving beacons, transponders, and/or powerlines. However, these systems can only locate the devices themselves rather than other objects within the system. Furthermore, these systems serve no other purpose than to track devices.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
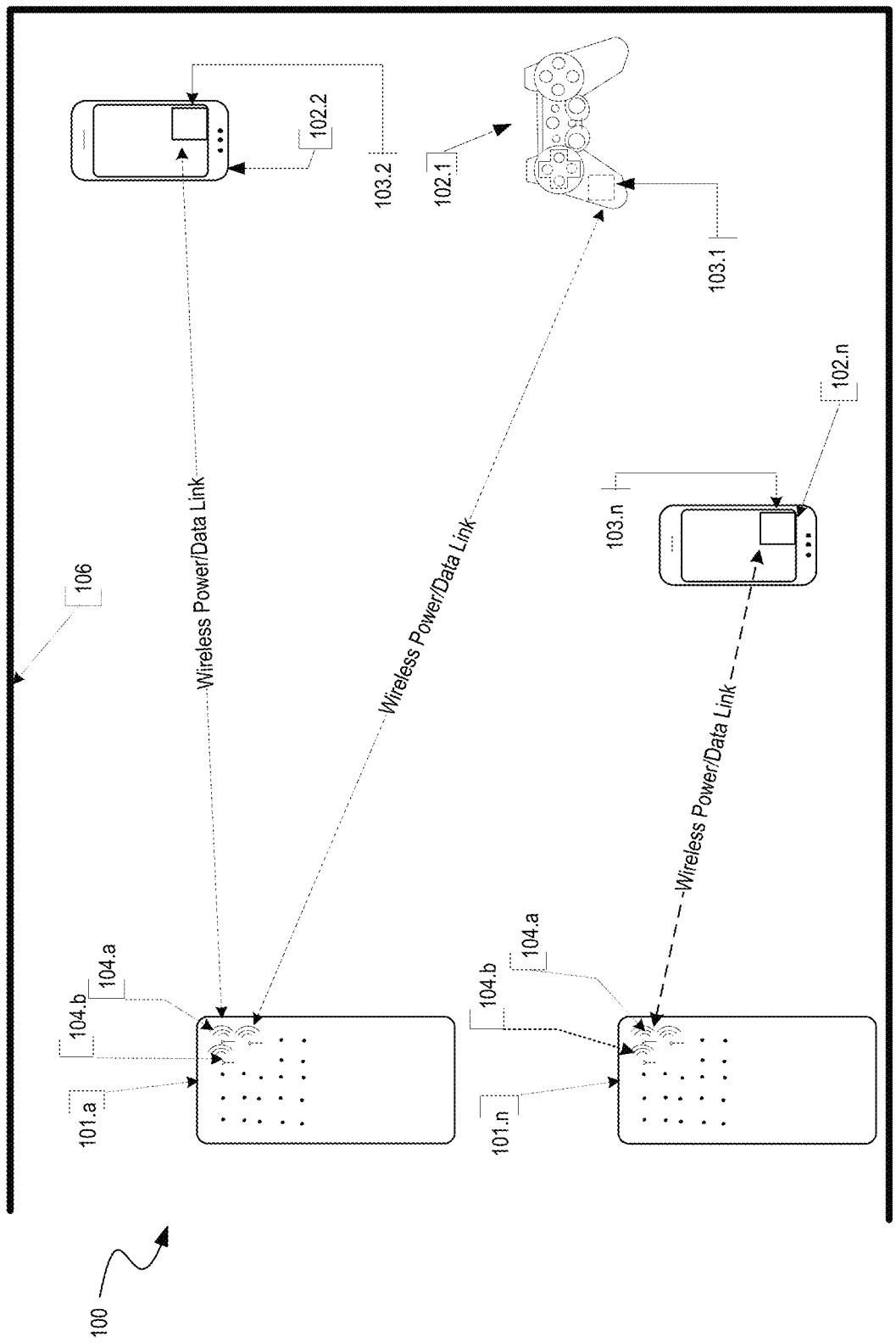
FIG. 1 is a block diagram illustrating an example wireless power delivery environment depicting wireless power delivery from one or more wireless chargers to various wireless devices within the wireless power delivery environment.

Techniques are described herein for imaging static or semi-static objects in a wireless power delivery environment and tracking non-static objects contained therein. More specifically, embodiments of the present disclosure describe techniques for determining the relative locations and movement of non-static objects in a wireless power delivery environment. Additionally, the techniques describe methods and systems for generation of motion-based maps such as heat (or dwell) maps and flow maps.

In some embodiments, the systems described herein can develop and/or otherwise generate a 3D RF image (holograph or map) of a wireless power delivery environment using a wireless power delivery system having multiple antennas, e.g., a wireless charger device. More specifically, the wireless power delivery system can receive beacon messages from wireless power receivers distributed throughout a wireless power delivery environment and develop a 3D radio frequency image based on the measured phases at each of the antennas.

In some embodiments, non-static objects within the wireless power delivery environment can be detected and/or otherwise identified based on changes in measured phases of the received beacon signals and knowledge of the static or semi-static environment 3D RF image (holograph or map) using ultrasound mathematics. The systems can then track the objects (or shadows) in a wireless charging environment.

Motion-based maps can be generated to represent the behavior. For example, the system can generate heat and/or flow maps.

Additionally, in some embodiments, the systems can predict behavior and/or perform various pattern detection algorithms based on the tracking data.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Any headings provided herein are for convenience only and do not necessarily affect the scope or meaning of the claimed invention.

I. Wireless Charging System Overview/Architecture

FIG. 1 is a diagram illustrating an example wireless power delivery environment 100 depicting wireless power delivery from one or more wireless chargers 101 to various wireless devices 102 within the wireless power delivery environment. More specifically, FIG. 1 illustrates an example wireless power delivery environment 100 in which wireless power and/or data can be delivered to available wireless devices 102.1-102.$n$ having one or more power receiver clients 103.1-103.$n$ (also referred to herein as "wireless power receivers" or "wireless power clients"). The wireless power receivers are configured to receive wireless power from one or more wireless chargers 101.

As shown in the example of FIG. 1, the wireless devices 102.1-102.$n$ are mobile phone devices 102.2 and 102.$n$, respectively, and a wireless game controller 102.1, although the wireless devices 102.1-102.$n$ can be any (smart or dumb) wireless device or system that needs power and is capable of receiving wireless power via one or more integrated power receiver clients 103.1-103.$n$. As discussed herein, the one or more integrated power receiver clients or "wireless power receivers" receive and process power from one or more transmitters/chargers 101.$a$-101.$n$ and provide the power to the wireless devices 102.1-102.$n$ for operation thereof.

Each charger 101 (also referred to herein as a "transmitter", "array of antennas" or "antenna array system") can include multiple antennas 104, e.g., an antenna array including hundreds or thousands of antennas, which are capable of delivering wireless power to wireless devices 102. In some embodiments, the antennas are adaptively-phased radio frequency antennas. The charger 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital logic and modems. In some embodiments, the charger 101 can have an embedded Wi-Fi hub.

The wireless devices 102 can include one or more receive power clients 103. As illustrated in the example of FIG. 1, power delivery antennas 104$a$ and data communication antennas 104$b$ are shown. The power delivery antennas 104$a$ are configured to provide delivery of wireless radio frequency power in the wireless power delivery environment. The data communication antennas are configured to send data communications to and receive data communications from the power receiver clients 103.1-103 and/or the wireless devices 102.1-102.$n$. In some embodiments, the data communication antennas can communicate via Bluetooth, Wi-Fi, Zigbee, etc.

Each power receiver client 103.1-103.$n$ includes one or more antennas (not shown) for receiving signals from the chargers 101. Likewise, each charger 101.$a$-101.$n$ includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.$n$. For example, coherent signals can be determined by computing the complex conjugate of a received beacon signal at each antenna of the array such that the coherent signal is properly phased for the particular power receiver client that transmitted the beacon signal.

Although not illustrated, each component of the environment, e.g., wireless power receiver, charger, etc., can include control and synchronization mechanisms, e.g., a data communication synchronization module. The chargers 101.*a*-101.*n* can be connected to a power source such as, for example, a power outlet or source connecting the chargers to a standard or primary alternating current (AC) power supply in a building. Alternatively or additionally, one or more of the chargers 101.*a*-101.*n* can be powered by a battery or via other mechanisms.

In some embodiments, the power receiver clients 102.1-102.*n* and/or the chargers 101.*a*-101.*n* utilize reflective objects 106 such as, for example, walls or other RF reflective obstructions within range to beacon and deliver and/or receive wireless power and/or data within the wireless power delivery environment. The reflective objects 106 can be utilized for multi-directional signal communication regardless of whether a blocking object is in the line of sight between the charger and the power receiver client.

As described herein, each wireless device 102.1-102.*n* can be any system and/or device, and/or any combination of devices/systems that can establish a connection with another device, a server and/or other systems within the example environment 100. In some embodiments, the wireless devices 102.1-102.*n* include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the charger 101 and the power receiver clients 103.1-103.*n* can each include a data communication module for communication via a data channel. Alternatively or additionally, the power receiver clients 103.1-103.*n* can direct the wireless devices 102.1-102.*n* to communicate with the charger via existing data communications modules.

Additionally, in some embodiments the beacon signal, which is primarily referred to herein as a continuous waveform, can alternatively or additionally take the form of a modulated signal.

Figure 2:
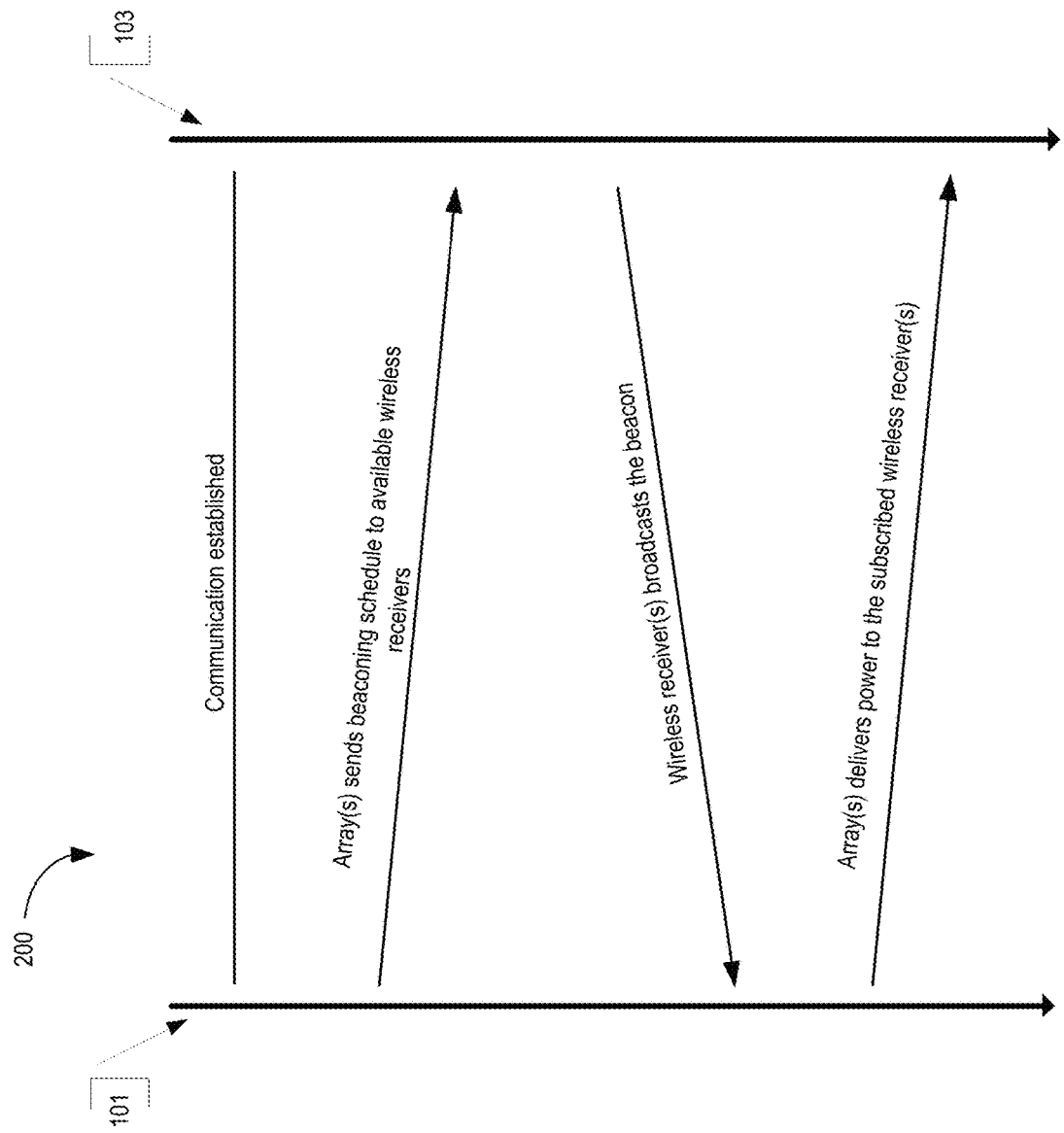
FIG. 2 is a sequence diagram illustrating example operations between a wireless charger and a wireless receiver device for commencing wireless power delivery, according to some embodiments.

FIG. 2 is a sequence diagram 200 illustrating example operations between a wireless charger 101 and a power receiver client 103 for commencing wireless power delivery, according to an embodiment. Initially, communication is established between the charger 101 and the power receiver client 103. The charger 101 subsequently sends a beaconing schedule to the power receiver client 103 to arrange the beacon broadcasting and the RF power/data delivery schedule. Based on the schedule, the power receiver client 103 broadcasts the beacon. As shown, the charger 101 receives the beacon from the power receiver client 103 and detects the phase (or direction) at which the beacon signal was received. The charger 101 then delivers wireless power and/or data to the power receiver client 103 based the phase (or direction) of the received beacon. That is, the charger 101 determines the complex conjugate of the phase and uses the complex conjugate to deliver power to the power receiver client 103 in the same direction in which the beacon signal was received from the power receiver client 103.

In some embodiments, the charger 101 includes many antennas; one or more of which are used to deliver power to the power receiver client 103. The charger 101 can detect phases at which the beacon signals that are received at each antenna. The large number of antennas may result in different beacon signals being received at each antenna of the charger 101. The charger may then determine the complex conjugate of the beacon signals received at each antenna. Using the complex conjugates, one or more antenna may emit a signal that takes into account the effects of the large number of antennas in the charger 101. In other words, the charger 101 emits a signal from one or more antennas in such a way as to create an aggregate signal from the one or more of the antennas that approximately recreates the waveform of the beacon in the opposite direction.

As described herein, wireless power can be delivered in power cycles. A more detailed example of the signaling required to commence wireless power delivery is described below with reference to FIG. 3. As discussed herein, once paired, the charger and the client have an established link for transmission of RF power and for communication of data. The following example describes an example of the system power cycle (which includes the pairing process) according to an embodiment.

In an example of operation, a master bus controller (MBC), which controls the charger array, receives power from a power source and is activated. The MBC activates the proxy antenna elements on the charger array and the proxy antenna elements enter a default "discovery" mode to identify available wireless receiver clients within range of the charger array. When a client is found, the antenna elements on the charger array power on, enumerate, and (optionally) calibrate.

Next, the MBC generates a Beacon Beat Schedule (BBS) cycle, and a Power Schedule (PS) for all wireless power receiver clients that are to receive power based on their corresponding properties and/or requirements. The MBC also identifies any other available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer it has until it runs out of power, priority in terms of usage, etc.

The Proxy AE broadcasts the BBS to all clients. As discussed herein, the BBS indicates when each client should send a beacon. Likewise the PS indicates when and to which clients the array should send power to. Each client starts broadcasting its beacon and receiving power from the array per the BBS and PS. The Proxy can concurrently query the Client Query Table to check the status of other available clients. A client can only exist in the BBS or the CQT (e.g., waitlist), but not in both. In some embodiments, a limited number of clients can be served on the BBS and PS (e.g., 32). Likewise, the CQT may also be limited to a number of clients (e.g., 32). Thus, for example, if more than 64 clients are within range of the charger, some of those clients would not be active in either the BBS or CQT. The information collected in the previous step continuously and/or periodically updates the BBS cycle and/or the PS.

Figure 3:
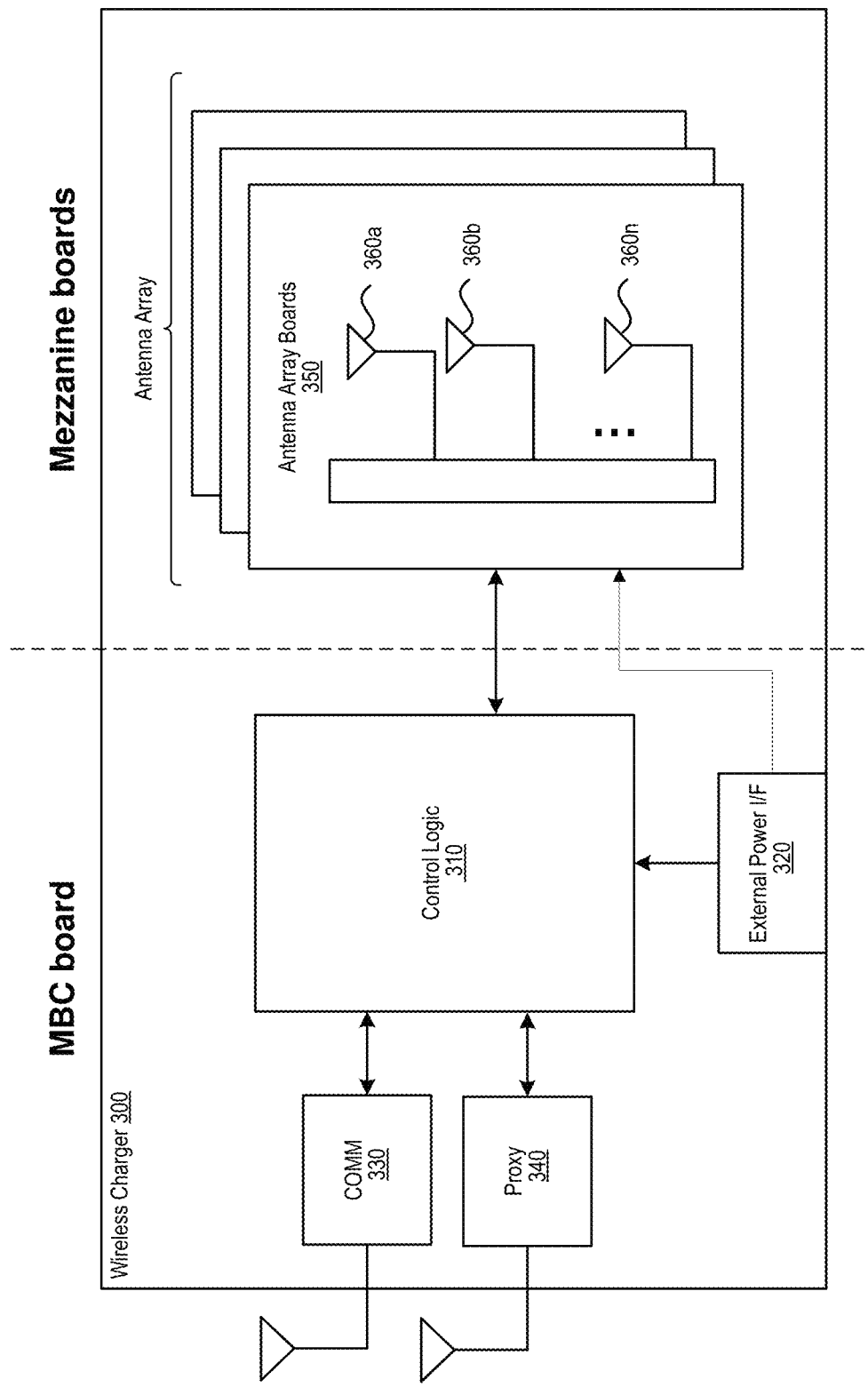
FIG. 3 is a block diagram illustrating example components of a wireless power transmitter (charger) in accordance with some embodiments.

FIG. 3 is a block diagram illustrating example components of a wireless charger 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external power interface (UF) 320, a communication block 330, and proxy 340. The mezzanine (or antenna array boards) 350 each include multiple antennas 360a-360n. Some or all of the components can be omitted in some embodiments. Additional components are also possible.

The control logic 310 is configured to provide all control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth, Wi-Fi, Zigbee, etc. Likewise, the proxy 340 can communicate with clients via data communications as discussed herein. The data communications can be Bluetooth, Wi-Fi, Zigbee, etc. The external power interface 320 is configured to receive external power and provide the power to various components. In some embodiments, the external power interface 320 may be configured to receive a standard external 24 Volt power supply. Alternative configurations are also possible.

Figure 4:
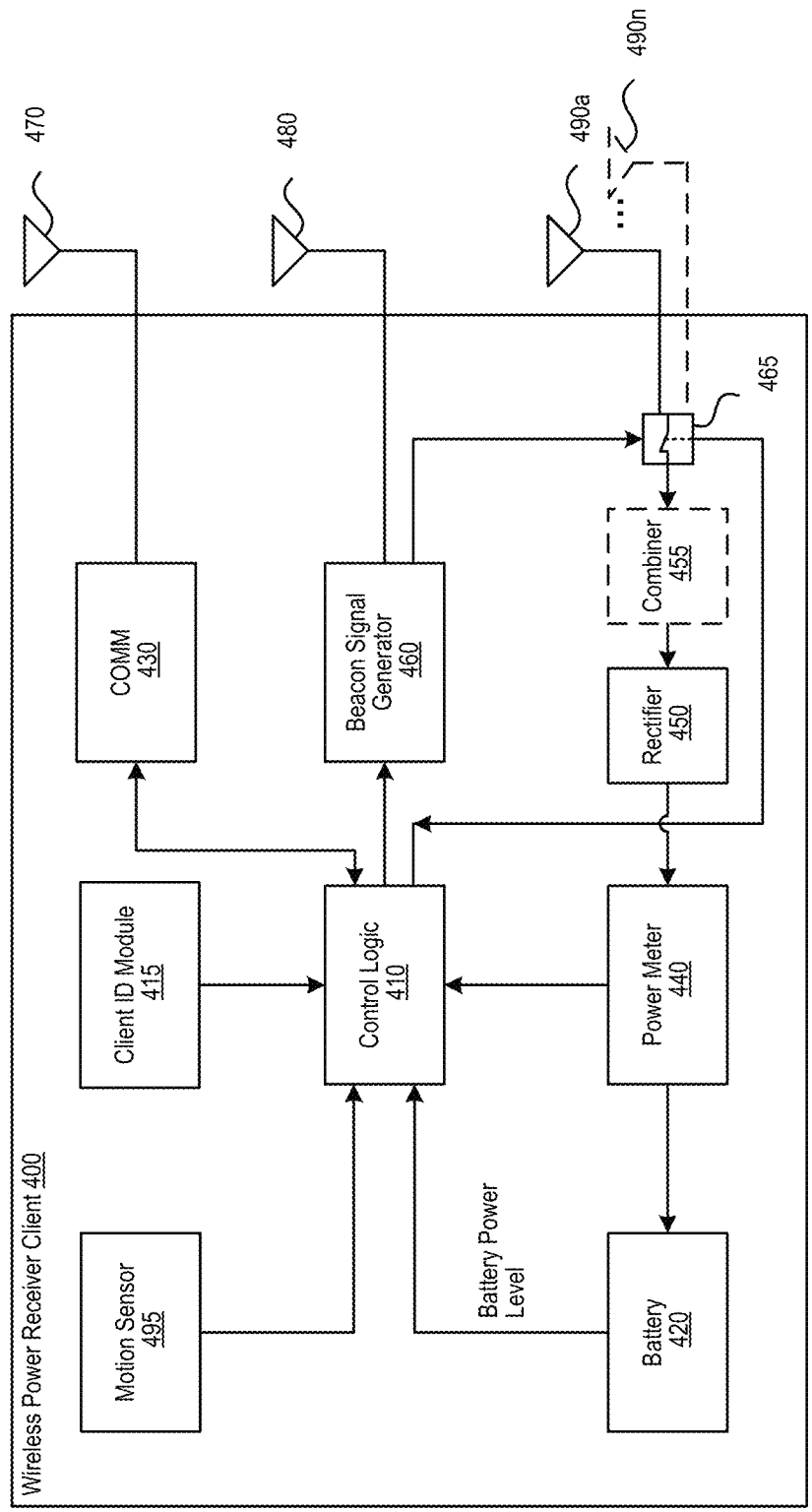
FIG. 4 is a block diagram illustrating example components of a wireless power receiver (client) in accordance with some embodiments.

FIG. 4 is a block diagram illustrating example components of a wireless power receiver (client), in accordance with some embodiments. As illustrated in the example of FIG. 4, the receiver 400 includes control logic 410, battery 420, communication block 430 and associated antenna 470, power meter 440, rectifier 450, a combiner 455, beacon signal generator 460 and an associated antenna 480, and switch 465 connecting the rectifier 450 or the beacon signal generator 460 to one or more associated antennas 490a-n. Some or all of the components can be omitted in some embodiments. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit.

The rectifier 450 receives the combined power transmission signal from the combiner 455, if present, which is fed through the power meter 440 to the battery 420 for charging. The power meter 440 measures the received power signal strength and provides the control logic 410 with this measurement. The control logic 410 also may receive the battery power level from the battery 420 itself. The control logic 410 may also transmit/receive via the communication block 430 a data signal on a data carrier frequency, such as the base signal clock for clock synchronization. The beacon signal generator 460 transmits the beacon signal, or calibration signal, using either the antenna 480 or 490. It may be noted that, although the battery 420 is shown for being charged and for providing power to the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

A client identifier (ID) module 415 stores a client ID that can uniquely identify the power receiver client in a wireless power delivery environment. For example, the ID can be transmitted to one or more chargers when communication are established. In some embodiments, power receiver clients may also be able to receive and identify other power receiver clients in a wireless power delivery environment based on the client ID.

An optional motion sensor 495 can detect motion and signal the control logic 410 to act accordingly. For example, when a device is receiving power at high frequencies, e.g., above 500 MHz, its location may become a hotspot of (incoming) radiation. Thus, when the device is on a person, e.g., embedded in a mobile device, the level of radiation may exceed acceptable radiation levels set by the Federal Communications Commission (FCC) or other medical/industrial authorities. To avoid any potential radiation issue, the device may integrate motion detection mechanisms such as accelerometers or equivalent mechanisms. Once the device detects that it is in motion, it may be assumed that it is being handled by a user, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

II. Imaging and Tracking Objects/Heat and Flow Map Generation

Various techniques and examples for imaging wireless power delivery environments and tracking objects contained therein are described in more detail below. More specifically, the embodiments below describe techniques for generating a 3D image (or hologram) of the wireless power delivery environment including static or semi-static objects using beacon signaling transmitted by power receiver clients distributed throughout the environment. The techniques also describe tracking non-static objects through the wireless power delivery environment and generating heat and flow maps to indicate movement of the non-static objects within the environment.

Figure 5:
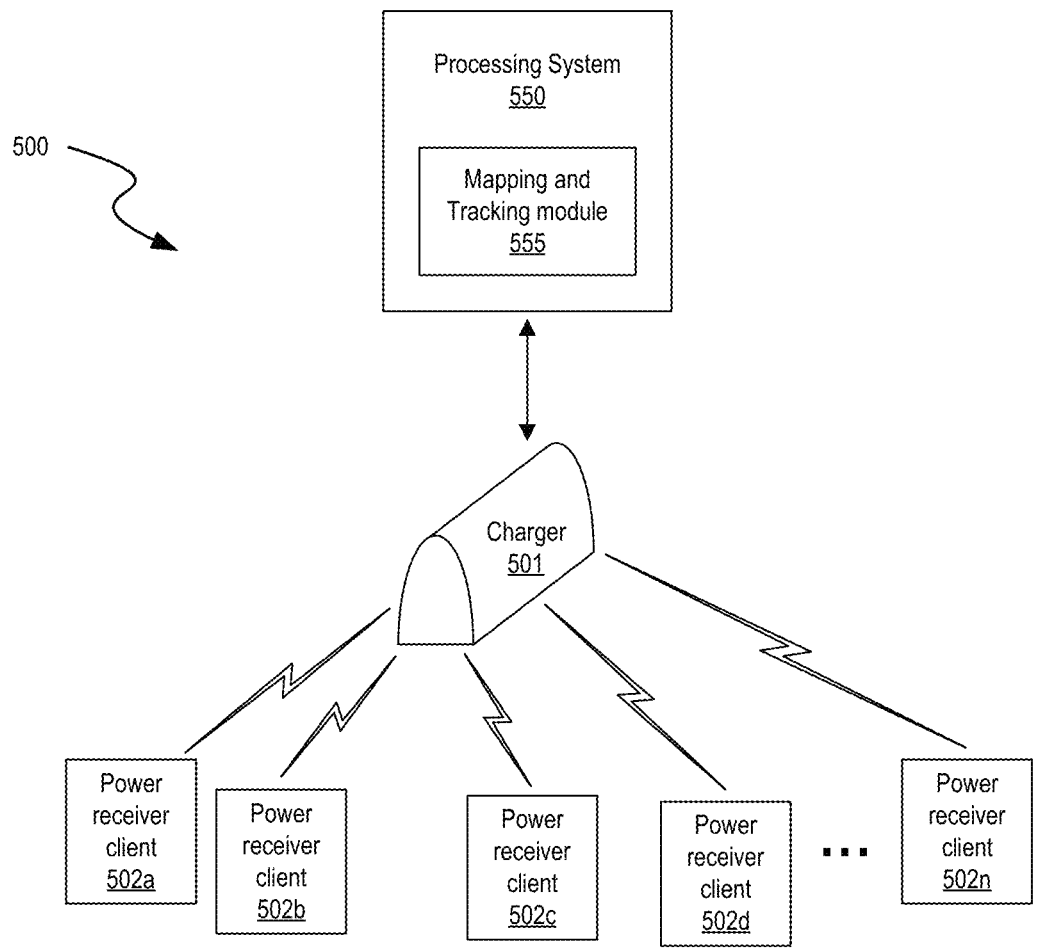
FIG. 5 is a diagram illustrating an example wireless power distribution (or delivery) environment including a processing system configured to, among other features, generate a three-dimensional (3D) image (or hologram) of static or semi-static objects in the wireless power distribution environment 500.

FIG. 5 is a diagram illustrating an example wireless power distribution (or delivery) environment 500 including a processing system 550 configured to, among other features, generate a 3D image (or hologram) of static or semi-static objects in the wireless power distribution environment 500. Additionally, the processing system 550 is further configured to track the relative locations and movement of non-static objects in the wireless power distribution environment 500.

As illustrated in the example of FIG. 5, the wireless power distribution (or delivery) environment 500 can include a wireless charger 501, multiple power receiver clients 503a-503n and the processing system 550. The power receiver client 503a-503n are configured to receive wireless power from the wireless charger 501. The power receiver clients 503a-503n can be embedded in static or semi-static objects throughout the wireless power distribution (or delivery) environment 500. For example, in some embodiments the power receiver clients 503a-503n can be embedded in wirelessly powered electronic display or price tag devices. Additionally, the power receiver clients 503a-503n can be embedded in non-static objects such as user devices, e.g., mobile phones. The charger 501 can be the charger 101 of FIG. 1, although alternative configurations are possible. The example of FIG. 5 shows a single wireless charger; however, the wireless power distribution (or delivery) environment 500 can include any number of chargers, which can, for example, extend the reach of the provide power to larger geographic environments and/or service more power receiver clients.

In some embodiments, the charger 501 communicates with the processing system 550 via any wired or wireless network. Furthermore, although shown as distinct systems, in some embodiments some or all of the components and/or functionality of the processing system 550 can, alternatively or additionally, be included in one or more wireless chargers 501.

As shown in the example of FIG. 5, processing system 550 includes a mapping and tracking module 555. The mapping and tracking module 555 is configured to generate a 3D image (or hologram) of the wireless power delivery environment 500 including static or semi-static objects and any other obstructions or reflective objects such as, for example, walls or other RF reflective obstructions within the wireless power distribution (or delivery) environment 500.

Figure 6:
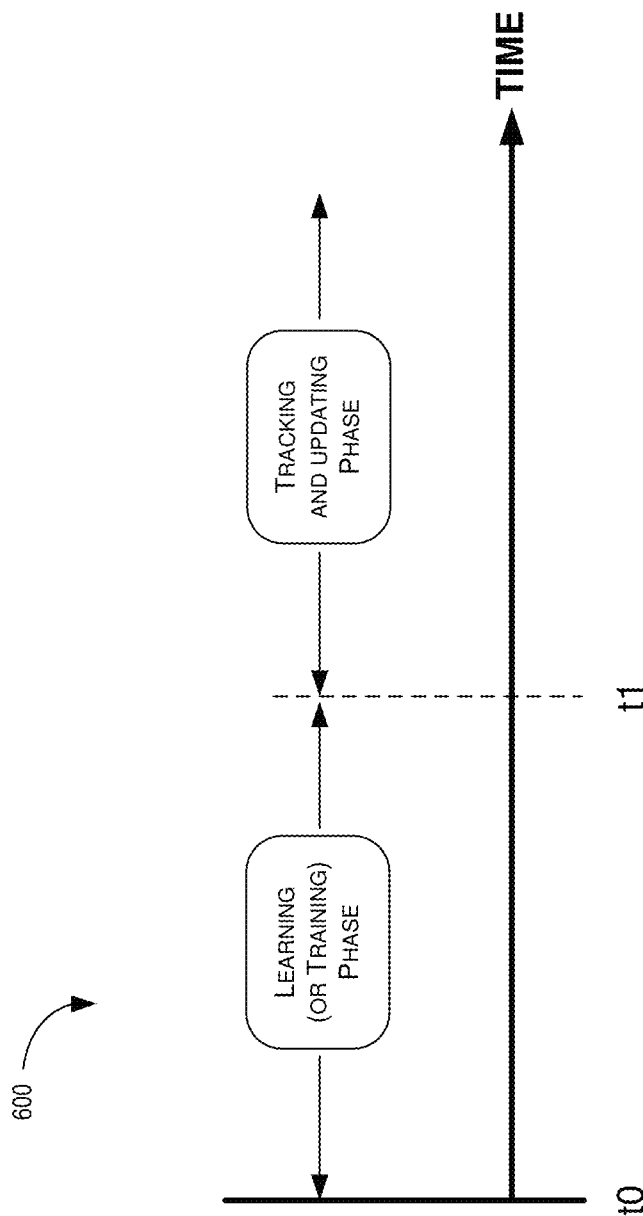
FIG. 6 is a diagram illustrating an example timeline indicating phases of the techniques described herein for imaging wireless power delivery environments and tracking objects therein.

As discussed herein, the wireless charger 501 is configured with multiple adaptively-phased antennas that receive beacon signals from the power receiver clients 503a-503n and measure the phases of the beacon signals at each of multiple adaptively-phased antennas. In some embodiments, the magnitudes of the beacon signals are also measured and compared as described herein. As illustrated in FIG. 6, operation of the wireless charger 501 and/or the processing system 550 can be divided into two phases: a learning (or training) phase and a tracking and updating phase.

During the learning (or training) phase, the 3D image (or hologram) of the wireless power delivery environment is generated based on received phases. The period of time t1 that is necessary to generate an initial 3D image (or hologram) of the wireless power delivery environment can vary depending on a number of factors. For example, the complexity of the environment, the number of chargers, the number of wireless power receivers transmitting beacon, and movement of non-static objects can all have an impact on the time that is required to generate an initial 3D image (or hologram) of the wireless power delivery environment.

Figure 10:
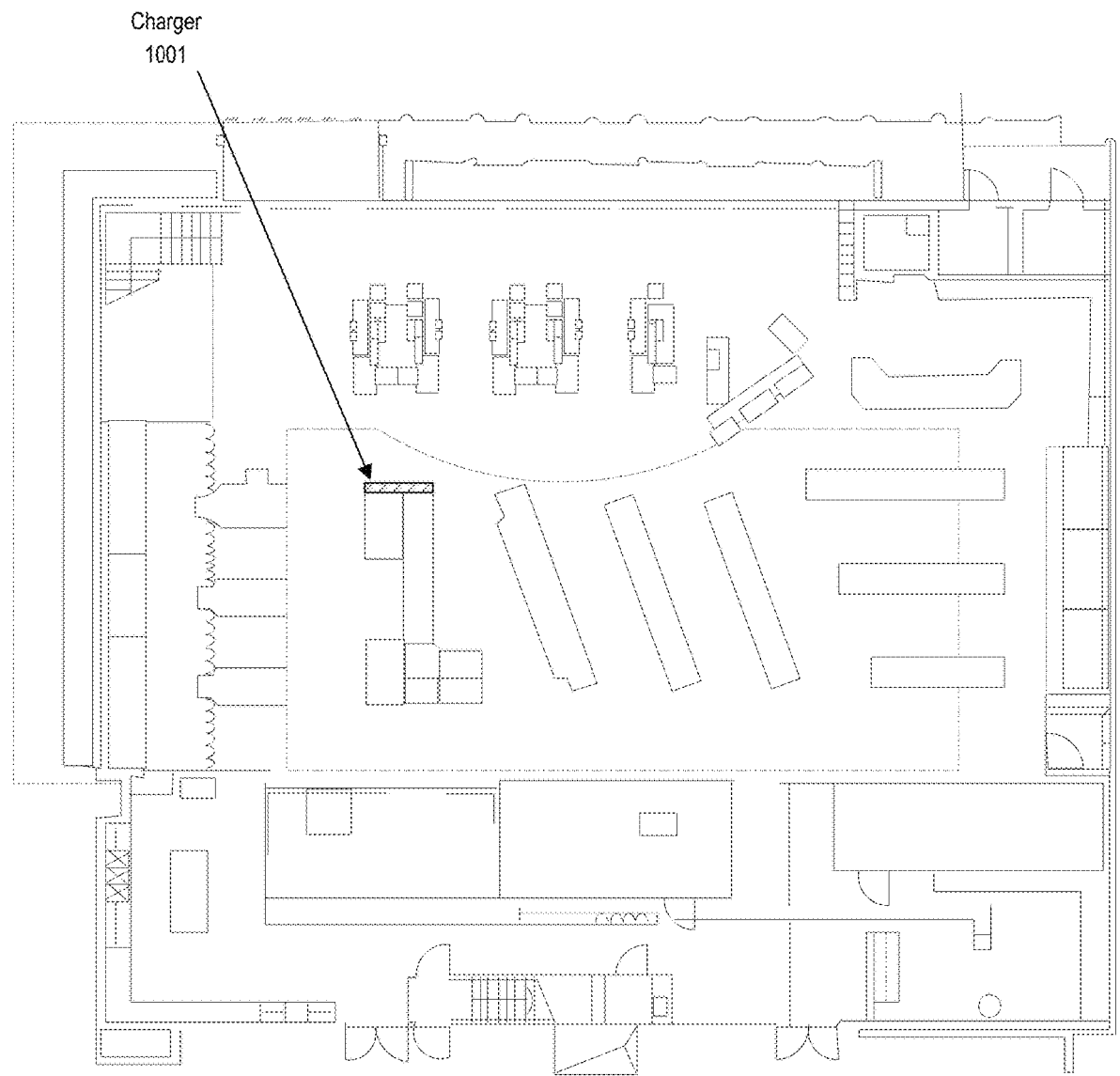
FIG. 10 illustrates a 2D representation of an example 3D image (or hologram) of a retail environment, according to some embodiments.

In some embodiments, the wireless charger 501 sends the phase measurements to the processing system 550 which receives the signals and, over a period of time, identifies the environment. For example, the processing system 550 can average the measurements over time to get a view of an empty store with static objects, e.g., by subtracting any objects that move. An example process for generating a 3D image (or hologram) of the wireless power delivery environment is shown and discussed in greater detail with reference to FIGS. 7A-7B. Likewise, FIG. 10 illustrates a 2D representation of an example 3D image (or hologram) of a retail environment.

During the tracking and updated phase, non-static objects are tracked though the 3D image (or hologram) of the wireless power delivery environment e.g., a retail environment. For example, non-static or moving objects such as, for example, customers in a retail environment can be tracked through the wireless power delivery environment e.g., a retail environment based on phase changes measured in the received beacon signals. An example process of tracking objects in a wireless power delivery environment is shown and discussed in greater detail with reference to FIG. 8.

Figure 7A:
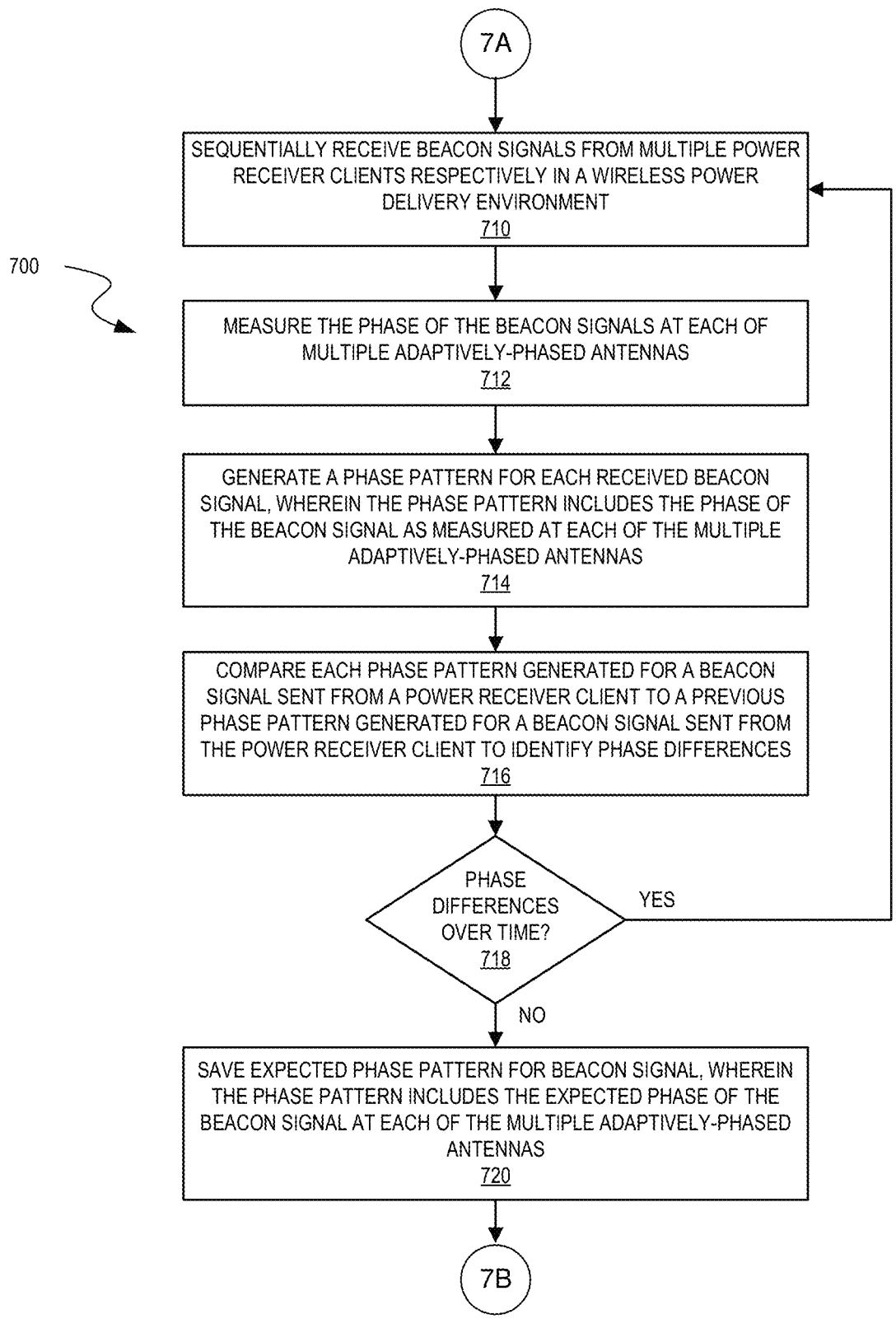
FIGS. 7A and 7B are data flow diagrams illustrating an example process for generating a 3D image (or hologram) of the wireless power delivery environment, according to some embodiments.
Figure 7B:
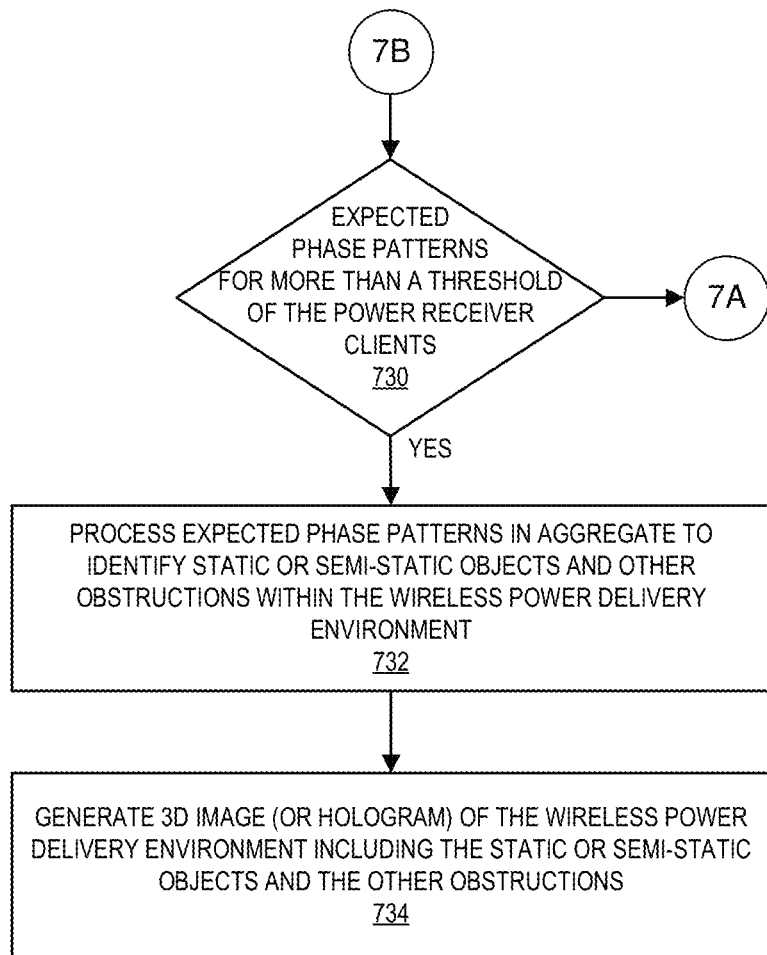

FIGS. 7A and 7B are data flow diagrams illustrating an example process 700 for generating a 3D image (or hologram) of the wireless power delivery environment, according to some embodiments. More specifically, the example process 700 illustrates generation of a 3D image (or hologram) during a learning (or training) phase. A wireless power delivery system can, among other functions, perform the example process 700. The wireless power delivery system can include components of a wireless charger, e.g., a wireless charger 501 of FIG. 5, and/or a processing system, e.g., processing system 550.

To begin, at process 710, the wireless power delivery system sequentially receives beacon signals from multiple power receiver clients respectively in a wireless power delivery environment. As discussed above, the power receiver clients can transmit beacons according to a BBS. At process 712, the wireless power delivery system measures the phase of the beacon signals at each of multiple adaptively-phased antennas. At process 714, the wireless power delivery system generates a phase pattern for each received beacon signal. The phase pattern includes the phase of the beacon signal as measured at each of the multiple adaptively-phased antennas.

At process 716, the wireless power delivery system compares each phase pattern generated for a beacon signal sent from a power receiver client to a previous phase pattern generated for a beacon signal sent from the power receiver client to identify phase differences. At decision process 718, the wireless power delivery system determines if the phases are differ over time. The process is performed by averaging out the measurements over a period of time to obtain a view of the environment with only static or semi-static objects. Non-static (or moving) objects are removed and/or otherwise subtracted out. If the measured phases substantially differ over time then the wireless charging system returns to process 710. If the measured phases are substantially the same over time then, at process 720, the wireless charging system saves the expected phase pattern for the beacon signal. As discussed herein, the phase pattern can include the expected phase of the beacon signal at each of the multiple adaptively-phased antennas.

At decision process 730, the wireless power delivery system determines if the expected phase patterns for more than a threshold of the power receiver clients have been saved. In some embodiments, the threshold can be include expected phase patterns for all of the power receiver clients in the wireless power delivery environment. Alternatively, the threshold can be a fraction or percentage of the beacons received from all power receiver clients within range.

At process 732, the wireless power delivery system processes the expected phase patterns in aggregate to identify static or semi-static objects and other obstructions within the wireless power delivery environment. In some embodiments, ultrasound mathematics can be used to identify the static or semi-static objects and the other obstructions within the wireless power delivery environment.

Lastly, at process 734, the wireless power delivery system generates a 3D image (or hologram) of the wireless power delivery environment include the static or semi-static objects and the other obstructions. As discussed herein, static or semi-static objects can be any objects that do not move for a movement threshold, e.g., multiple minutes, hours, days, etc. For example, shelfing units in a retail store or even items on the shelfs can be considered static or semi-static even though they may eventually be moved or sold. Non-static items are those objects that exceed the movement threshold. For example, customers or patrons may move about a store and remain static for short periods of time without exceeding the movement threshold, e.g., while waiting in line, reading product information, etc., are thus, considered non-static objects herein.

Figure 8:
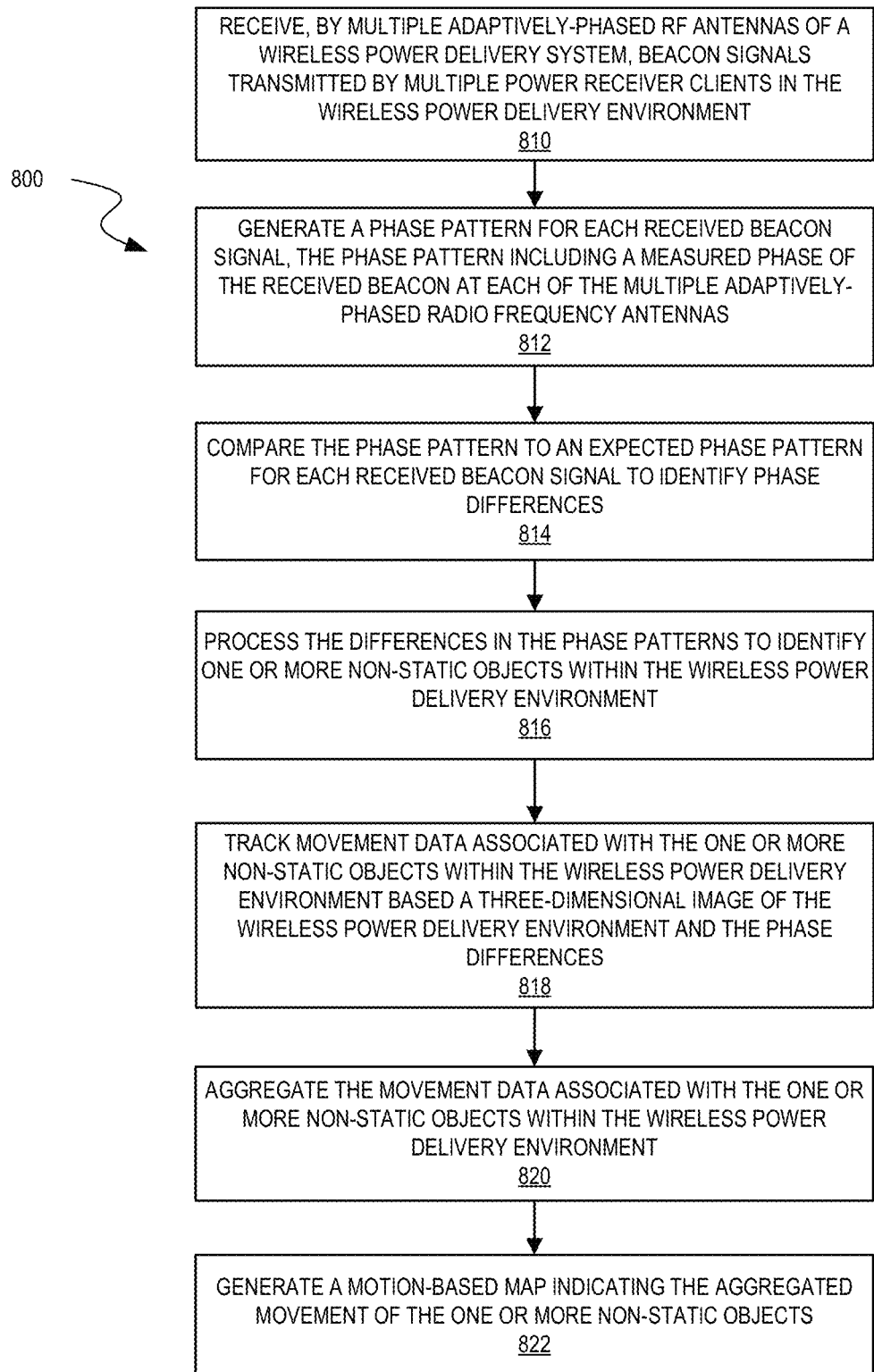
FIG. 8 is a data flow diagram illustrating an example process for tracking objects in a wireless power delivery environment, according to some embodiments.

FIG. 8 is a data flow diagram illustrating an example process 800 for tracking objects in a wireless power delivery environment, according to some embodiments. More specifically, the example process 800 illustrates tracking non-static objects, e.g., customers or patrons, through a wireless power delivery environment based on phase changes of received beacon signals that are transmitted by power receiver clients distributed throughout the wireless power delivery environment. As discussed above, the 3D image (or hologram) can be generated and/or otherwise developed during a learning (or training) phase. A wireless power delivery system can, among other functions, perform the example process 800. The wireless power delivery system can include components of a wireless charger, e.g., a wireless charger 501 of FIG. 5, and/or a processing system, e.g., processing system 550.

To begin, at process 810, the wireless power delivery system receives beacon signals transmitted by multiple power receiver clients in the wireless power delivery environment. As discussed herein, the beacon signals are received at multiple adaptively-phased radio frequency antennas of the wireless power delivery system over a period of time.

At process 812, the wireless power delivery system generates a phase pattern for each received beacon signal. Each phase pattern includes a measured phase of the received beacon at each of the multiple adaptively-phased RF antennas. In some embodiments, the phase pattern can also include measured magnitude information of the received beacon signal at each of the multiple adaptively-phased RF antennas.

At process 814, the wireless power delivery system compares the phase patterns to an expected phase pattern. As discussed herein, the expected phase pattern includes the phases at which each beacon signal is expected to be received by the wireless power delivery system in the absence of non-static (or moving) objects within the wireless power delivery environment, which can affect the measured phases.

At process 816, the wireless power delivery system processes the phase differences to identify one or more non-static objects within the wireless power delivery environment.

At process 818, the wireless power delivery system tracks movement data associated with the one or more non-static objects based on the 3D image (or hologram) of the wireless power delivery environment and the phase differences in the phase patterns. For example, in some embodiments, ultrasound mathematics can be used to identify and track the locations or movement of the non-static objects within the wireless power delivery environment. As discussed above, the three-dimensional image identifies shapes and relative locations of static or semi-static objects within the wireless power delivery environment. In some embodiments, the shape and relative locations of the static and non-static objects in the wireless power delivery environment can be determined with wavelength level accuracy.

At process 820, the wireless power delivery system aggregates the movement data associated with the one or more non-static objects within the wireless power delivery environment. In some embodiments, the movement data can be aggregated over a period of time, e.g., 2 hour time periods, a day, etc.

At process 822, the wireless power delivery system generates a motion-based map indicating the aggregated movement of the one or more non-static objects within the wireless power delivery environment.

In some embodiments, generating the motion-based map includes processing the aggregated movement data associated with the one or more non-static objects to identify one or more dwell points within the wireless power delivery environment, and identifying the dwell points on the three-dimensional image of the wireless power delivery environment. The dwell points can indicate stagnation in particular area of the wireless power delivery environment for a corresponding dwell time. The identification of the dwell points on the three-dimensional image can include, for example, superimposing or otherwise marking the dwell points on the three-dimensional image of the wireless power delivery environment. Alternatively or additionally, the dwell points could be added on top of the three-dimensional image of the wireless power delivery environment via layer data. Other examples are also possible.

Figure 13:
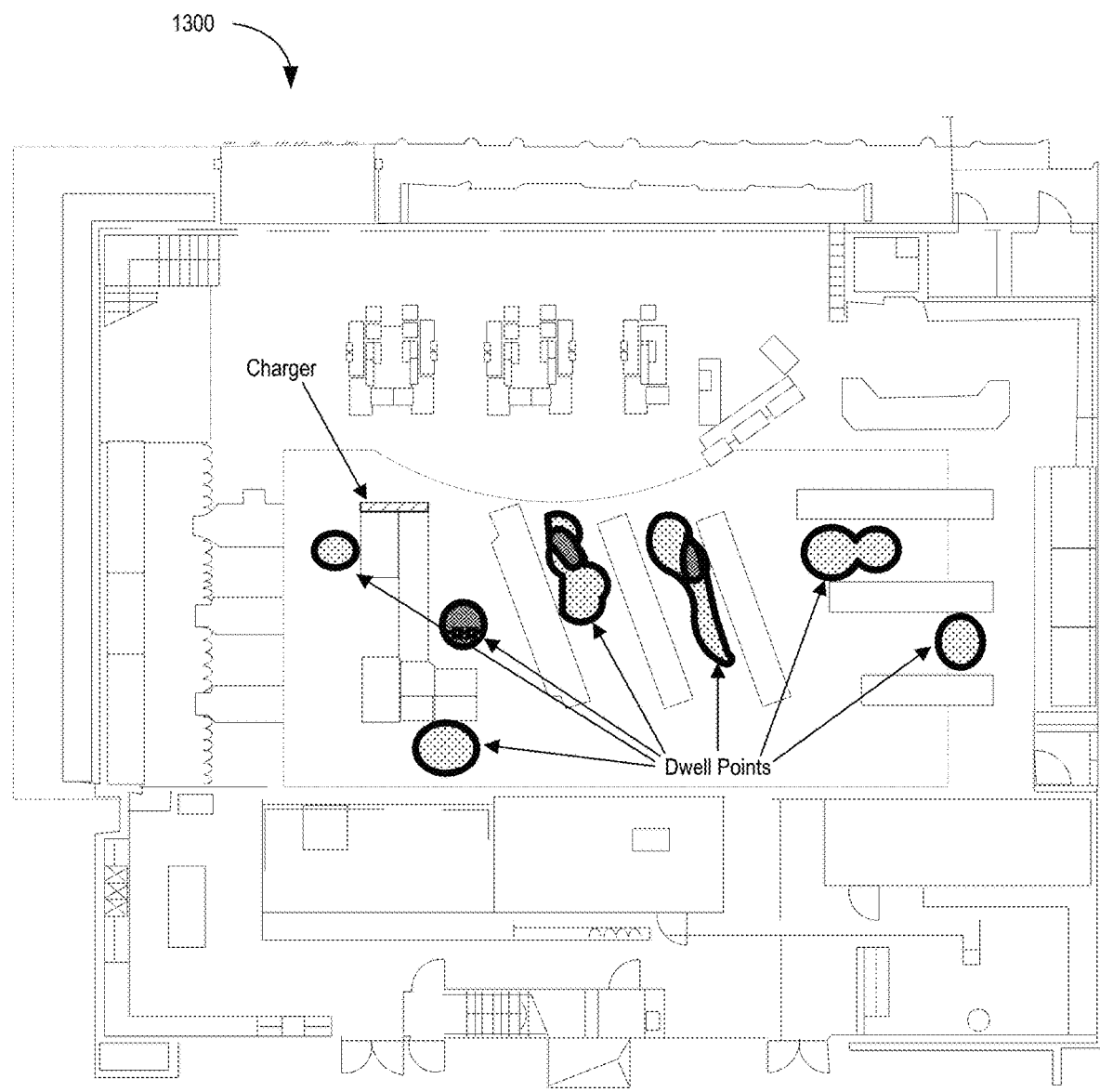
FIG. 13 is diagram illustrating an example heat (or dwell map), according to some embodiments.

In some embodiments, the dwell points indicate a corresponding dwell time on the three-dimensional image of the wireless environment. Colors or shading can be used to indicate the dwell time. For example, darker shading or colors could indicate a longer dwell time. In some instances, the system can determine the shade or color based on pre-determined ranges of time or quantization. An example motion-based map that includes the dwell times (also referred to as a heat map herein) is shown in FIG. 13.

In some embodiments, generating the motion-based map includes processing the aggregated movement data associated with the one or more non-static objects to identify one or more motion vectors within the wireless power delivery environment, and identifying the motion vectors on the three-dimensional image of the wireless power delivery environment. The motion vectors can indicate a general direction of motion of the one or more static objects and can be, in some embodiments, derived from the motion-based map including the dwell times. The identification of the motion vectors on the three-dimensional image can include, for example, superimposing or otherwise marking the motion vectors on the three-dimensional image of the wireless power delivery environment. Alternatively or additionally, the motion vectors could be added on top of the three-dimensional image of the wireless power delivery environment via layer data. Other examples are also possible. The motion vectors can be derived from movement data and in some instances, indicate a magnitude of the flow. For example if most customers move in a particular direction, e.g., >90%, the motion vector can be darkened or lengthened relative to other vectors.

III. Retail Solutions and Wireless Electronic Displays

Figure 9:
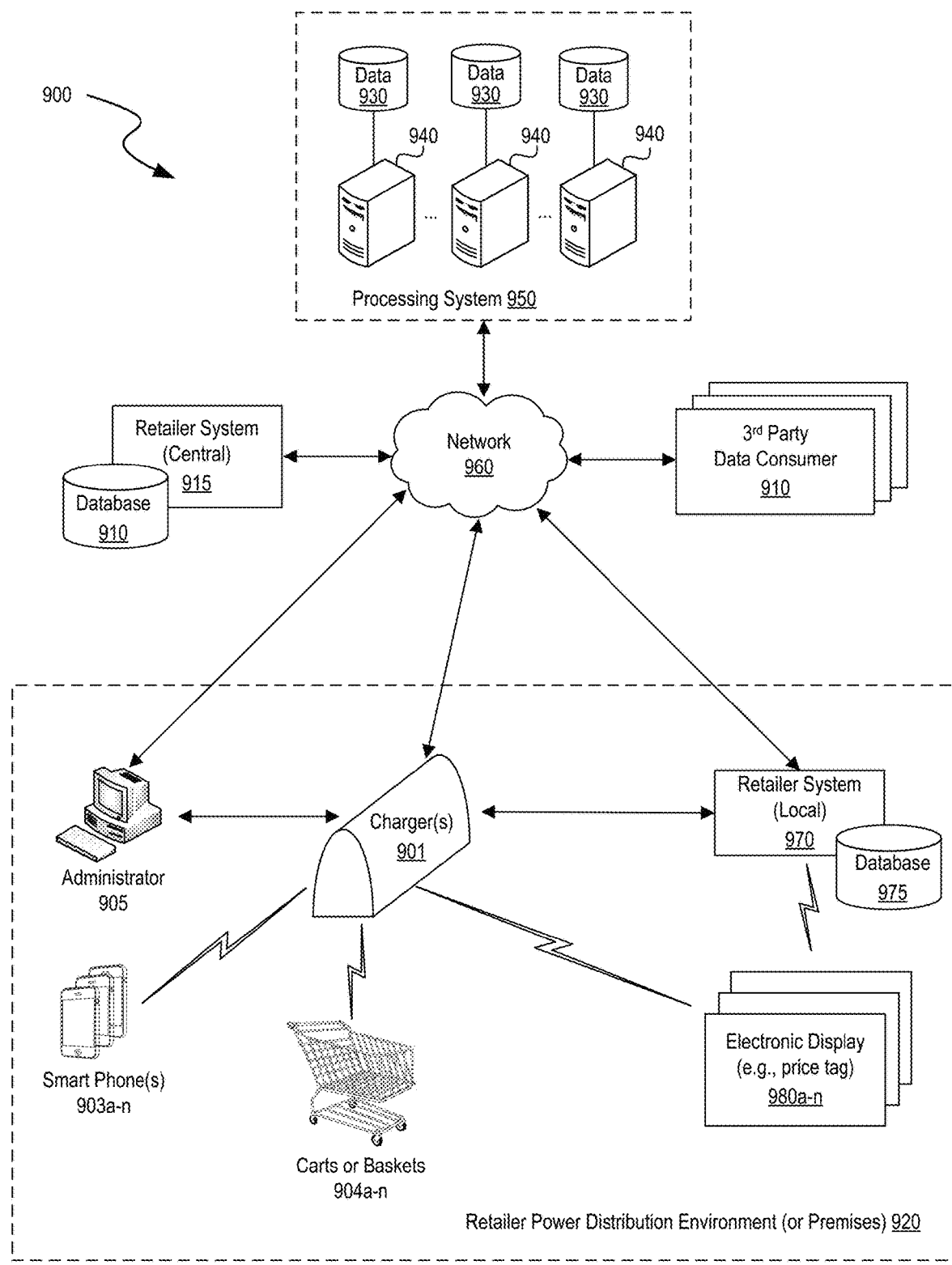
FIG. 9 is a diagram illustrating a wireless power distribution (or delivery) environment in the form of an example distributed retail environment, according to some embodiments.

FIG. 9 is a diagram illustrating a wireless power distribution (or delivery) environment in the form of an example distributed retail environment 900, according to some embodiments. The retail environment 900 can be the wireless power distribution (or delivery) environment 500 of FIG. 5, although alternative configurations are possible. Additional or fewer components are possible.

As shown in the example of FIG. 9, the retail environment 900 includes a processing system 950, a network 960, multiple third-party data consumers 910, a centralized retailer system 915 in communication with a centralized retailer database 910 and at least one retailer power distribution premises 920. In some embodiments, an administrator can access and/or otherwise control or provision the one or more chargers 901 via the local retailer system 970.

The retailer power distribution premises 920 can include one or more chargers 901 in communication with the network 960, an administrator device 905 (either locally or via network 960), and a local retailer system 970 in communication with a local database 975. The one or more chargers 901 are in further communication with various devices having embedded wireless power receiver clients such as, for example, power receiver client 400 of FIG. 4. As shown in the example of FIG. 9, the devices include multiple smart phones (or other smart devices) 903*a-n*, multiple carts or baskets 904, and multiple wireless electronic displays 980*a-n*. The wireless electronic displays 980*a-n* can be, for example wireless price tag devices. Components of an example wireless electronic display are shown and discussed in greater detail with reference to FIG. 12.

The processing system 950 can, among other features, generate or facilitate generation of a 3D image (or hologram) of static or semi-static objects in the retailer power distribution premises 920. FIG. 10 illustrates a 2D representation of an example 3D image (or hologram) of static or semi-static objects in the retailer power distribution premises 920. The processing system 950 can also track or facilitate tracking of the relative locations and movement of non-static objects (e.g., customers) in the retailer power distribution premises 920. Additionally, the processing system 950 can provide smart recommendations to customers (not shown) and can further facilitate (in whole or in part) the imaging and tracking techniques described herein. Although shown as cloud-based, in some embodiments some or all of the processing system 950, or the functionality of the processing system 950, can alternatively or additionally be located in the retailer power distribution premises 920. For example, the functionality of the processing system 950 discussed herein can, alternatively or additionally, be performed by the one or more chargers 901 and/or the local retailer system 970.

As shown in FIG. 9, the processing system 950 includes multiple servers 940 and data repositories 930. Any number of servers 940 and/or data repositories 930 may be included in processing system 950. In some embodiments, the cloud processing system 950 can include a recommendation engine (not shown) configured to provide customers with individual product recommendations based on, for example, historical performance of other customers/consumers with similar taste, etc. Additionally, the processing system 950 can include various learning systems and/or algorithms. For example, the processing system 950 can provide supervised learning (or machine learning systems) which can leverage classification algorithms to identify items or products based on criteria, and can be trained with more data and refinement of results, etc. Examples of usage include, by way of example and not limitation, pattern and image recognition. Additionally, the processing system 950 can provide unsupervised learning leverage clustering algorithms to identify patterns/trends in data, etc.

The one or more chargers 901 provide wireless power to various wireless devices as described herein. For example, the wireless devices can be any wireless device (smart or dumb) or system that needs power and is capable of receiving wireless power via one or more integrated power receiver clients. The wireless devices can be wireless devices 102.1-102.*n* of FIG. 1 and the power receiver clients can be power receiver clients 103.1-103.*n*, although alternative configurations are possible. As described herein, the chargers 901 can facilitate generation of a 3D image (or hologram) of static or semi-static objects in the retailer power distribution premises 920 based on beacon signals received from electronic displays 980*a-n* that are distributed throughout, and wirelessly powered within, retailer power distribution premises 920. The electronic displays 980*a-n* are generally static in the retailer power distribution premises 920 and, in some embodiments, their relative locations will be provided to the charger and/or processing system for facilitating generation of the 3D image (or hologram) the retailer power distribution premises 920.

Objects within the retailer power distribution premises 920 can subsequently be tracked based on phase changes in received beacon signals that are measured at the wireless chargers 901. As discussed herein, the phase changes occur as a result of non-static objects or obstructions, e.g., customers moving around a store, etc. The phase changes are used in conjunction with the 3D image (or hologram) of the environment to determine relative locations of objects and to track objects (e.g., customers) through the retailer power distribution premises 920. In some instances, customers can also be individually identified and tracked via wireless power receiver client embedded on their person, e.g., in their wireless device, or embedded in a cart or basket associated with the customer.

As discussed herein, techniques are also described for determining customer behavior or patterns. In the example of FIG. 9, the customer behavior or patterns can be determined by the processing system 950, the one or more chargers 901 and/or the local retailer system 970. In some embodiments, the local retailer system 970 can dynamically drive changes (e.g., demand-based pricing) to the electronic displays (e.g., prices for price tags) based on the customer behavior or patterns. For example, the customer behavior or patterns can identify when a store might be busy, e.g., from 5:00 PM-7:00 PM, or when quantity of a particular item is limited, and the prices could automatically be driven up. The local retailer system 970 can also identify perishable items and gradually reduce the price so that the retailer produces less waste.

In some embodiments, the electronic displays (e.g., price tags) described in this example are wirelessly charged and thus, retailers can drive price changes without being concerned with the draining batteries or battery systems of the electronic displays. In some embodiments, each wirelessly-powered electronic display can represent a mini e-Commerce website for the specific item. The electronic display can present data including information associated with an item or product. By way of example and not limitation, the information can include item description information, item pricing information, aggregated customer score or ratings associated with the item, and/or customer reviews associated with the item.

In some embodiments, customers can have carts or baskets 904*a-n* equipped with one or more integrated power receiver clients that can alternatively or additionally be used to track the customers. Although not shown, in some embodiments, in addition to providing location information, power receiver clients integrated into carts or baskets can power themselves and/or interaction units, e.g., display units, capable of providing the customer with information and/or receiving information from the customers.

Customer profile information such as customer preferences, purchase history, etc., can be maintained and/or otherwise processed in various locations. For example, the retailer may maintain customer profile information at a central retailer system 915 in one or more databases 910. This can be useful for retailers with multiple store locations. Alternatively or additionally, local systems such as, for example, retailer system 970 can maintain customer profile information. In some embodiments, the information is provided to various local retailer systems 970 by a central retailer system 915.

As discussed herein, the electronic display(s) 980*a-n* can receive power and/or data from wireless chargers 901. Alternatively or additionally, the electronic display(s) 980 can have other wired or wireless networking connections and/or otherwise be in communication with a local retailer system 970 and/or a central retailer system 915. For example, the electronic display(s) 980 can be in communication with a local retailer system 970 and/or a central retailer system 915 via a wireless local area network (WLAN) such as Wi-Fi, Wi-Fi Direct, etc., or a wireless personal area network (WPAN) such as Bluetooth, Zigbee, RFID etc. In some embodiments, the electronic display(s) 980 and/or the local retailer system 970 and/or the central retailer system 915 can also be in direct communication with customers' wireless devices via WLAN, WPAN, etc.

In some embodiments, the retailer systems can dynamically push out price updates for items or products to the electronic display(s) 980. The price update information can be pushed out to the electronic display(s) 980 by way of one or more chargers 2301. Alternatively or additionally, the price update information can be pushed out wirelessly to the electronic display(s) 980 via a local retailer system 970 and/or a central retailer system 915. The system can also track item or product availability for product ordering (reordering), shelf restocking, etc.

In some embodiments, the electronic display(s) 980 comprise price information, e.g., electronic price tags. Once the customer is within a specific range (threshold range) from the electronic price tag, the electronic price tag may be able to identify the customer through, for example, a loyalty card or the customer's wireless device. As discussed herein, profile information can be kept and stored about customers in addition to tracking the customers. The electronic displays 980, e.g., electronic price tags, can then customize information to the customer. As discussed in greater detail below, the electronic displays have embedded power receiver clients that send beacon signals to a charger and are used to generate a map of the wireless environment. In some embodiments, the retailer systems may know the layout of the store and communicate with the charger the locations of the static electronic displays through wired or wireless mechanisms.

In some embodiments, the cloud processing system 950 can process information related to items purchased by customers at one or more retailer locations, items purchased by similar customers, etc., and provide product recommendations and/or messages to the customers. The product recommendations and/or messages can be provided to the customer's associated wireless device and/or display equipped cart/basket. Alternatively or additionally, the product recommendations and/or messages can be provided to the electronic displays 980 near or proximate to the customer. In yet other embodiments, the product recommendations and/or messages can be sent to the customers via email, SMS messaging, etc.

As discussed above, the techniques described herein can facilitate various data collection, customer tracking, and motion detection functionality. The collected data can be processed by a cloud processing system to develop individual profile information about customers and/or aggregated and provided to third party data consumers 910. The profile information can include historical data, e.g., purchases, visits, movement through retail premises, etc.

In some embodiments, the system provides for various consumer reviews including descriptions and rankings (or scoring) of products. Examples of a customer scoring and a customer description review are shown and discussed in greater detail with reference to FIGS. 15B and 15C, respectively.

In some embodiments, a customer can create a shopping list and use an application downloaded to the wireless device to automatically create a shopping plan route. The shopping plan route can be calculated based on the layout of the retail premises as determined by the charger. Furthermore, the wireless device can help guide the customer through the store in real-time and re-calculate the route automatically when the customer takes detours and/or otherwise changes course. Essentially, the system provides an indoor GPS system that tracks the customer through the retail environment using the customer's wireless device and/or cart/basket and the system's knowledge of the store layout, e.g., store shelving and electronic displays 980 for the particular items or products.

In some embodiments, one or more components of the system can direct the electronic displays to provide special instructions corresponding to an item purchased or to be purchased. The special instructions can, for example, include products and/or services that can be (or are regularly) used in conjunction and/or are otherwise related to a particular item purchased or to be purchased. The system can suggest the additional item and then guide the user through retailer premises to the location of the additional item.

As discussed above, FIG. 10 illustrates a 2D representation of an example 3D image (or hologram) of a retail environment 1000 that is generated as described herein. The retail environment 1000 can be the retailer power distribution premises 920 of FIG. 9, although alternative configurations are possible. A single wireless charger 1001 is shown in the example retail environment of FIG. 10, however, the environment can include any number of chargers. As shown in the example of FIG. 10, multiple display racks on which retail items or products can be placed are shown.

Figure 11:
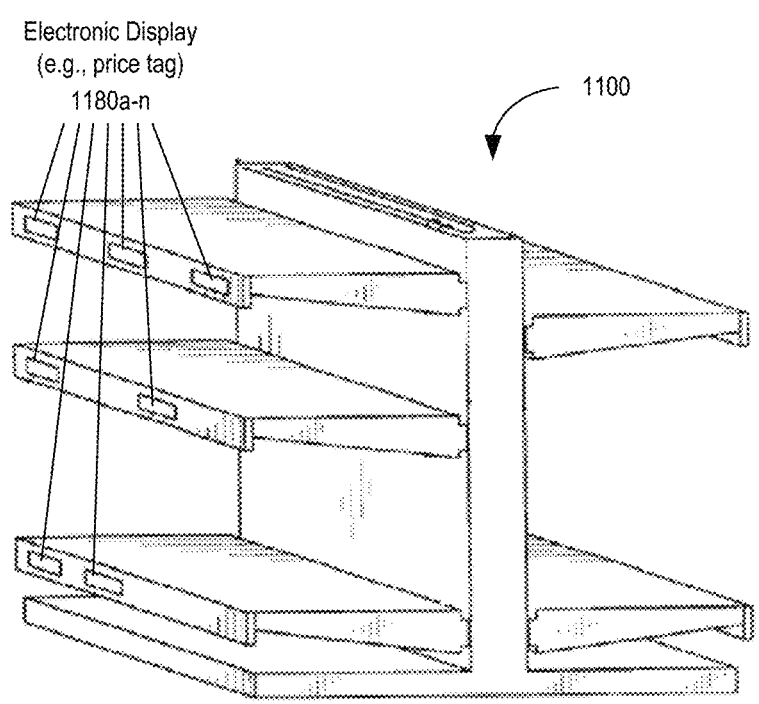
FIG. 11 is a diagram illustrating an example display rack, according to some embodiments.

FIG. 11 is a diagram illustrating an example display rack 1100, according to an embodiment. The display rack 1100 can include multiple wireless electronic displays (or price tags) 1180a-n that can present communications (e.g., prices and other product information) to customers. As discussed herein the presented communications can dynamically be change frequently without concern for battery life as the electronic displays 1180 each include one or more wireless power receivers.

Figure 12:
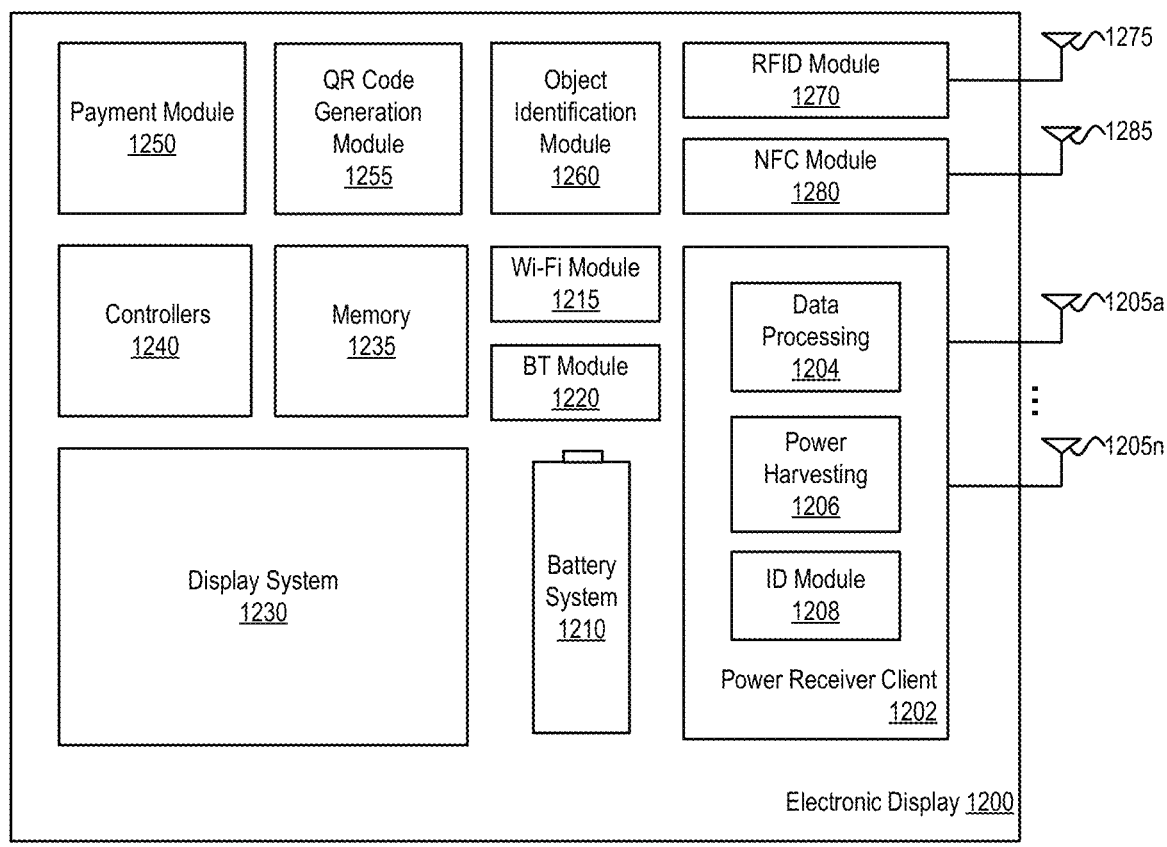
FIG. 12 is a block diagram illustrating example components of an electronic display, according to some embodiments.

FIG. 12 is a block diagram illustrating example components of an electronic display 1200, in accordance with some embodiments. The electronic display 1200 can be any electronic display 980a-n of FIG. 9 or 1180a-n of FIG. 11, although alternative configurations are possible.

As illustrated in the example of FIG. 12, the electronic display 1200 includes a power receiver client 1202, a battery system 1210, a Bluetooth (BT) module 1215, a Wi-Fi module 1220, a display system 1230, a memory 1235, one or more controllers 1240, a payment module 1250, an object identification module 1260, an RFID module 1270 having an RFID antenna 1275, and a near field communication (NFC) module 1280 having an NFC antenna 1285. Additional or fewer components are possible. Furthermore, the electronic display 1200 can be encased and/otherwise protected in whole or in part by a housing (not shown).

The power receiver client 1202 can be wireless power receiver client 400 of FIG. 4, although alternative configurations are possible. As shown in the example of FIG. 12, the power receiver client 1202 includes a data processing module 1204, a power harvesting module 1206, and an identification (ID) module 1208. Additional or fewer components or modules are possible. Furthermore, the power receiver client 1202 can be communicatively coupled to one or more antennas 1205a-n configured to received data and power signals. In some embodiments, antennas 1205a-n can be shared with data communication modules such as Wi-Fi module 1215 and BT module 1220 which are configured to process data signals received via their respective standards. In some embodiments, the data processing module 1204 can route the data signals to the appropriate modules for processing.

The power harvesting module 1206 can harvest power received from a charger. The battery system 1210 can power operation of the electronic display 1202. The power receiver client 1202 can charge the battery system 1210 via an internal battery (not shown) or directly. As discussed, the Wi-Fi module 1220 and the Bluetooth (BT) module 1215 are configured to receive and process data communications from other systems or apparatuses within the wireless power delivery environment.

The memory 1235 can be any memory system configured to store instructions which can be executed by one or more controllers 1240. In some embodiments, the controllers can also control the display system 1230. In some embodiments, the display system 1230 can be an interactive system such as a touch screen display; however other embodiments are possible. By way of example and not limitation, the display screen 1230 can be an e-ink display, a liquid crystal display, a light emitting diode display, etc., including combinations or variations thereof.

In some embodiments, a payment module 1250 can process payment information and/or otherwise facilitate payment via the electronic display 1200. For example, a QR code generation module can generate a QR code that can be scanned by customer using a mobile device. Once scanned, cart information can be updated and payment can be made via the customer's mobile device. Alternatively or additionally, in some embodiments payment can be made via NFC module 1280. The information can be routed to the payment module 1250 for processing and finalization.

In some embodiments, the electronic display 1200 can identify proximate objects (e.g., customers) via a loyalty card, the user's mobile device, etc. For example, a loyalty card can have an embedded RFID tag which can be read by RFID module 1270 when proximate the loyalty card. The object identification module 1260 can search the database and/or otherwise request information about the use. Alternatively, the identity information can be transferred to a local or cloud-based retail or processing system for further processing.

FIG. 13 is diagram illustrating an example heat (or dwell map) 1300, according to some embodiments. More specifically, the heat (or dwell map) 1300 includes dwell times that are indicated on the example 3D image (or hologram) of a retail environment 1000 that is generated as described with reference to FIG. 10.

Figure 14:
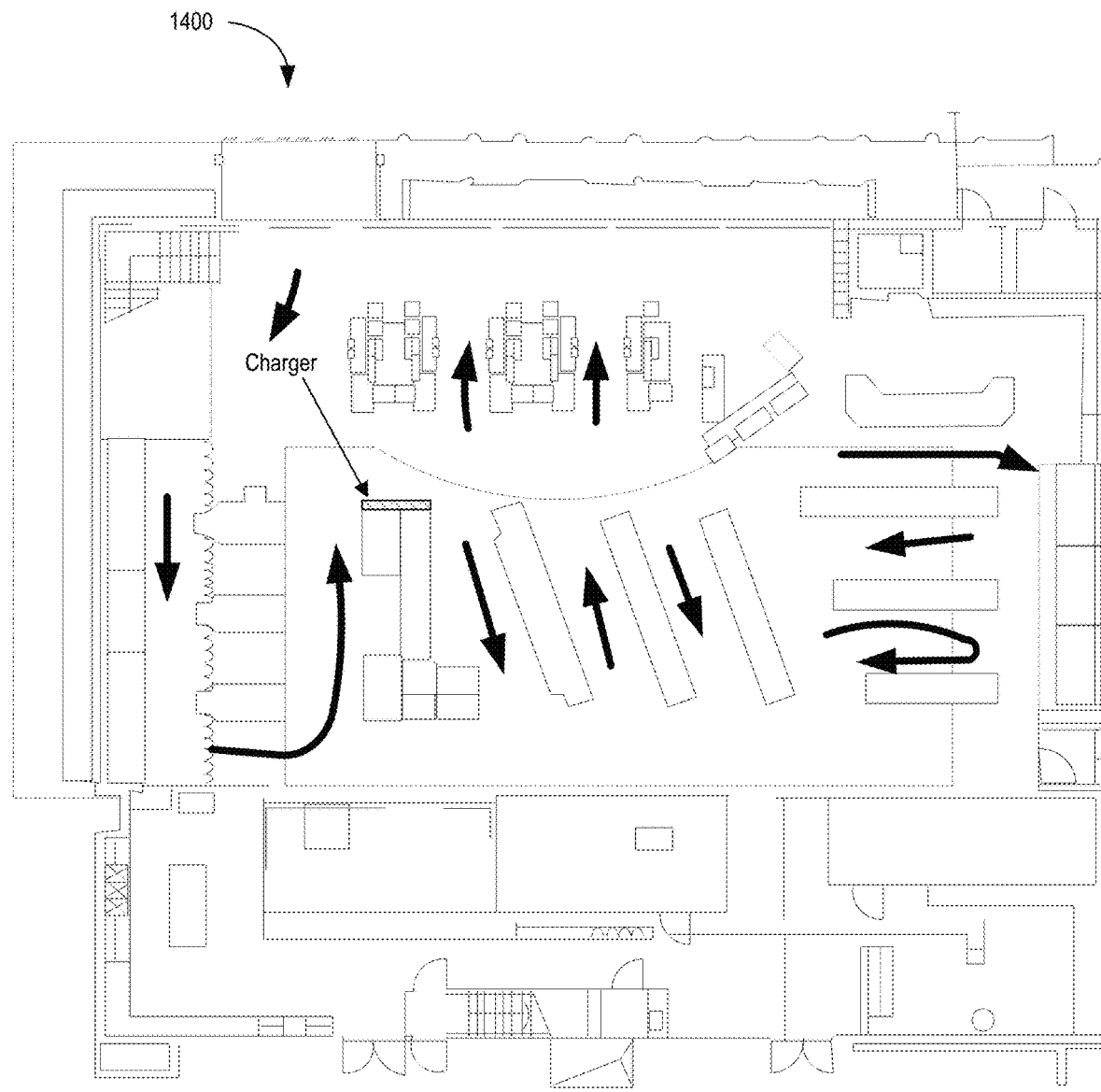
FIG. 14 is a diagram illustrating an example flow map, according to some embodiments.

FIG. 14 is a diagram illustrating an example flow map 1400, according to some embodiments. More specifically, the flow map 1400 includes motion vectors that are indicated on the example 3D image (or hologram) of a retail environment 1000 that is generated as described with reference to FIG. 10.

Figure 15A:
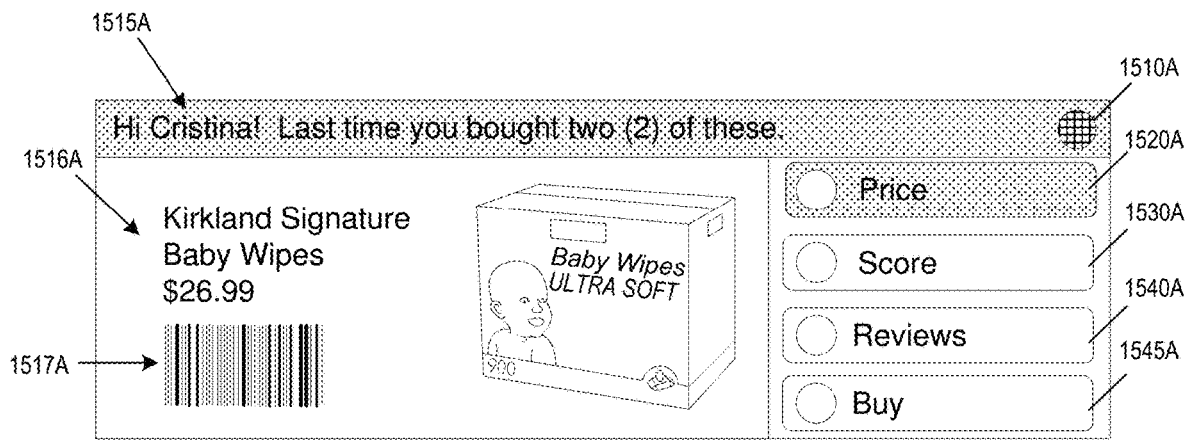
FIGS. 15A-15D illustrate various examples of graphical user interfaces that can be displayed to a customer via an electronic display (or price tag) when the customer is near or proximate to the electronic display, according to some embodiments.
Figure 15B:
Figure 15C:

FIGS. 15A-15D illustrate various examples of the graphical user interfaces that can be displayed to a customer via an electronic display (or price tag) when the customer is near or proximate to the electronic display. As discussed herein, a local retailer system such as, for example, local retailer system 970 of FIG. 9 can, among other features, provide and/or otherwise drive electronic displays with particular information about a nearby customer and/or provide communications to customize the electronic display for that customer. FIGS. 15A-C illustrate various examples of the graphical user interfaces that can be displayed to the customer via the electronic display 980 when the customer is near or proximate to the electronic display 980.

In the examples of FIGS. 15A-15D a top descriptor pane 1515A-D communicates information to the customer when the customer is within a threshold distance from the electronic display 1580. An indicator button 1510A-D on the descriptor pane 1515A-D can indicate when a customer is detected. For example, the indicator button 1510A-D can light up green when the customer is detected. Additionally, in some embodiments, the customer's wireless device can also provide some indication of proximity (closeness or pairing) with a nearby electronic display.

Figure 15D:

In some embodiments, a button pane on the right of the display can allow the customer to transition (e.g., via touchscreen) through various screens. In particular, a price screen (also referred to herein as an introduction screen) is shown in the example of FIG. 15A, a score screen is shown in the example of FIG. 15B, a review screen is shown in the example of FIG. 15C, and a buy screen is shown in the example of FIG. 15D.

In some embodiments, the price screen can be the default screen shown to the customer immediately upon detection (or pairing with the customer). Alternatively or additionally, selection by the customer of the price buttons 1520A-D (e.g., via touchscreen) can cause or otherwise direct the electronic display to show the price screen. As illustrated in the example of FIG. 15A, the top descriptor pane 1515A can provide the user with a greeting. In this example, the top descriptor pane 1515A provides the following greeting: "Hi Cristina! Last time you bought two (2) of these," when the customer (i.e., Christina or Christina's device) is near or proximate to the electronic display. In this example, the electronic display is associated with and/or corresponding to Kirkland Signature Baby Wipes. Additional product information portion 1516A can show information about the product and a price. Bar code portion 1517A can provide the product barcode (e.g., UPC code).

Selection by the customer of the score buttons 1530A-D (e.g., via touchscreen) can cause or otherwise direct the electronic display to show the score screen. As illustrated in the example of FIG. 15B, the score screen shows a score message in the descriptor pane 1515B. In this example, the score message recites: "Overall score: 4.3. Looks like a highly rated product with good value." A score portion 1550B illustrates the scores the product received (e.g., based on customer that bought the product at particular retailer locations, e.g., Walmart, Amazon, Target). The retailer location information is optional.

Selection by the customer of the review buttons 1540A-D (e.g., via touchscreen) can cause or otherwise direct the electronic display to show the review screen. As illustrated in the example of FIG. 15C, the review screen shows a message in the descriptor pane 1515C indicating a particular review that is currently displayed in the review portion 1560C.

Selection by the customer of the buy button 1545A-D (e.g., via touchscreen) can cause or otherwise direct the electronic display to show a code for scanning by the customer. As illustrated in the example of FIG. 15D, the buy screen shows a QR Code. The QR Code can be scanned by the customer via, for example, an application on the customers mobile device. Once scanned, the QR Code can automatically cause an eCommerce web page to launch on the device (not shown). The eCommerce web page allows the customer to purchase the item. For example, the customer can enter the quantity directly from the shelf and make payment (e.g., make the payment on the spot or by adding the item(s) to a list of purchased items such that when the customer arrives at checkout, all of the items are scanned). This means that the shopper (or customer) has the ability to either pay for each item individually or collectively without an official physical checkout. Alternatively, the customer can check out via an automated clerk that takes the payment (e.g., the automated clerk will know what the customer purchased based on the list of purchased items).

In alternative embodiments to the examples shown and discussed in the examples of FIGS. 15A-D, various design variations are possible. For example, in some embodiments, it is possible to include a single button on the screen with an indicator next to the label such that the user or customer knows which screen they are on. In such cases, each click of the button will cause a move to the next screen. When the user reaches the Review screen, for example, the user can double press to review and can scroll through the reviews until interrupted by a press that will send them to the next screen. It is appreciated that other embodiments and variations are possible.

Example Systems

Figure 16:
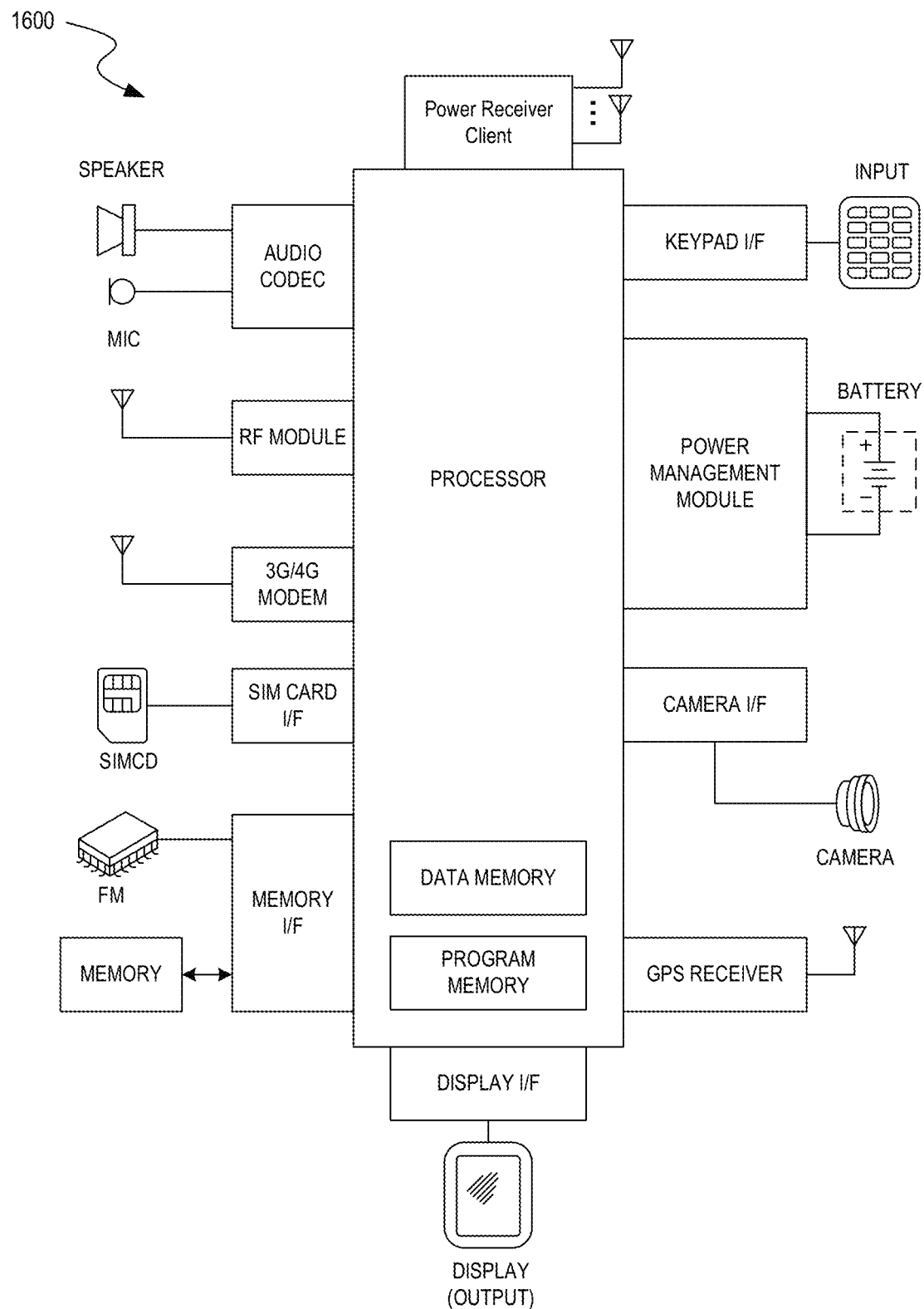
FIG. 16 depicts a block diagram illustrating example components of a representative mobile device or tablet computer with a wireless power receiver or client in the form of a mobile (or smart) phone or tablet computer device, according to some embodiments.

FIG. 16 depicts a block diagram illustrating example components of a representative mobile device or tablet computer 1600 with a wireless power receiver or client in the form of a mobile (or smart) phone or tablet computer device, according to an embodiment. Various interfaces and modules are shown with reference to FIG. 16, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver clients 103 of FIG. 1, although alternative configurations are possible. Additionally, the wireless power receiver client can include one or more RF antennas for reception of power and/or data signals from a charger, e.g., charger 101 of FIG. 1.

Figure 17:
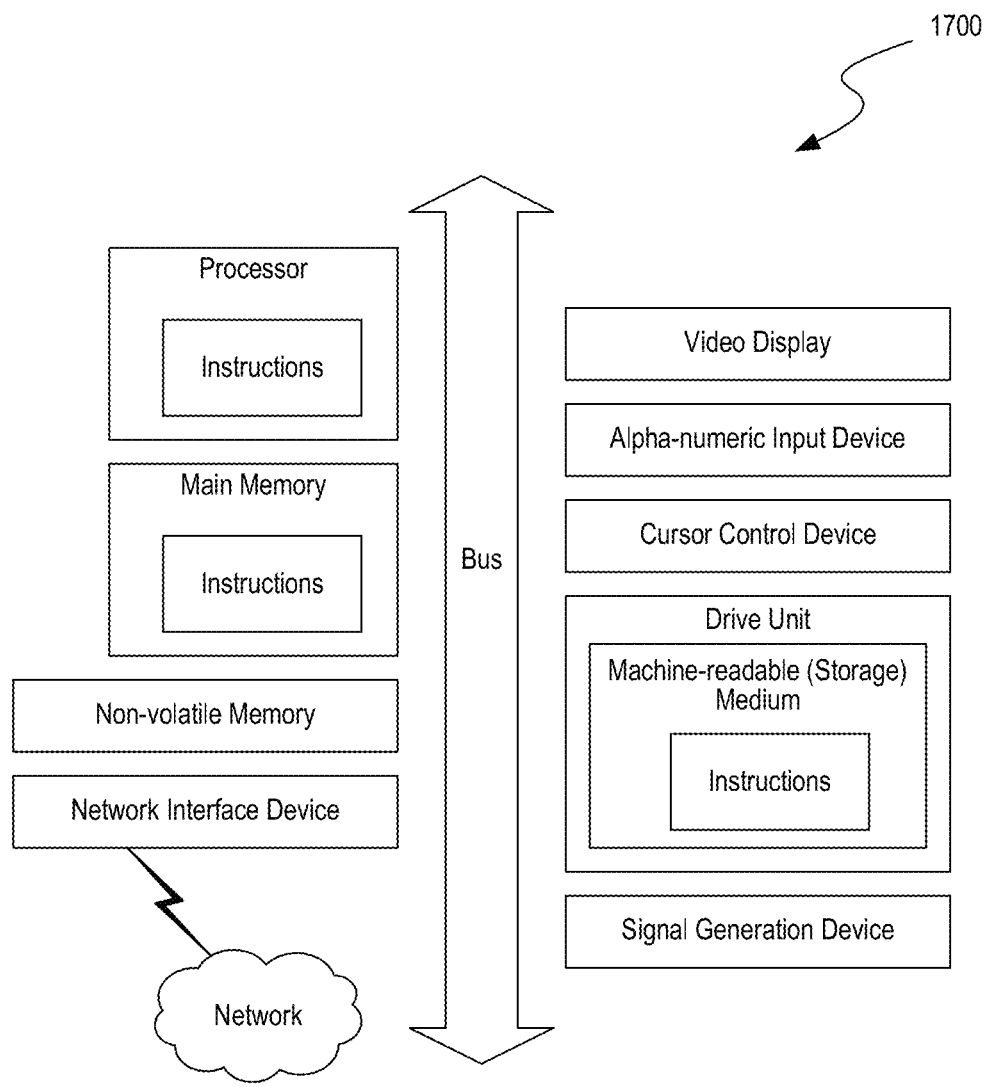
FIG. 17 depicts a diagrammatic representation of a machine, in the example form, of a computer system within which a set of instructions, for causing the machine to perform any one or more of the methodologies discussed herein, may be executed.

FIG. 17 depicts a diagrammatic representation of a machine, in the example form, of a computer system within which a set of instructions, for causing the machine to perform any one or more of the methodologies discussed herein, may be executed.

In the example of FIG. 17, the computer system includes a processor, memory, non-volatile memory, and an interface device. Various common components (e.g., cache memory) are omitted for illustrative simplicity. The computer system 1700 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 17 reside in the interface.

In operation, the computer system 1700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A system comprising: an antenna array, and a processor operably coupled to the antenna array, the processor configured to:
   determine a first phase pattern at which a signal is received by multiple antennas of the antenna array at a first time from a client device in a wireless signaling environment;
   determine a second phase pattern at which the signal is received from the client device by the multiple antennas at a second time after the first time;
   identify a difference between the first and second phase patterns; and
   determine, based at least in part on the difference, presence or absence of at least one of:
   movement of the client device, and
   one or more objects positioned in a transmission path of the signal, in the wireless signaling environment.

2. The system of claim 1, wherein the processor is further configured to:
   determine the first phase pattern by measuring phases at which the signal is received at the first time by the multiple antennas; and
   determine the second phase pattern by measuring phases at which the signal is received at the second time by the multiple antennas.

3. The system of claim 1, wherein the wireless signaling environment includes a plurality of client devices, and wherein the processor is further configured to:
   determine a first set of phase patterns at which signals are received in a first period of time from the plurality of client devices by the multiple antennas;
   determine a second set of phase patterns at which the signals are received in a second period of time from the plurality of client devices by the multiple antennas;
   identify differences between the first and second sets of phase patterns; and
   generate a map or image of the wireless signaling environment based on the differences.

4. The system of claim 3, wherein the plurality of client devices include: at least one client device positioned statically in the wireless signaling environment, and at least one other non-static or semi-static client device, and wherein the processor is further configured to generate the map or image by subtracting phase measurements of any moving client devices in the wireless signaling environment.

5. The system of claim 4, wherein the processor is further configured to track the at least one other non-static or semi-static client device in the wireless signaling environment based on the differences.

6. The system of claim 1, wherein the wireless signaling environment includes a retail store, and wherein the client device is selected from the group comprising: an electronic display device, a label, and a price tag device.

7. The system of claim 1, wherein the processor is configured to determine presence or absence of one or more objects positioned in the transmission path of the signal, the processor further configured to determine presence or absence of movement of the one or more objects in the wireless signaling environment.

8. The system of claim 1, wherein the multiple antennas include adaptively-phased radio frequency antennas.

9. A method comprising:
  receiving, by an antenna array at a first time, a signal transmitted by a client device in a wireless signaling environment;
  determining a first phase pattern at which the signal is received at the first time by multiple antennas of the antenna array;
  receiving, by the antenna array at a second time after the first time, the signal transmitted by the client device;
  determining a second phase pattern at which the signal is received at the second time by the multiple antennas;
  identifying a difference between the first and second phase patterns; and
  determining, based at least in part on the difference, presence or absence of at least one of:
    movement of the client device, and
    one or more objects positioned in a transmission path of the signal,
  in the wireless signaling environment.

10. The method of claim 9, wherein:
  determining the first phase pattern comprises measuring phases at which the signal is received at the first time by the multiple antennas; and
  determining the second phase pattern comprises measuring phases at which the signal is received at the second time by the multiple antennas.

11. The method of claim 9, wherein the wireless signaling environment includes a plurality of client devices, the method further comprising:
  determining a first set of phase patterns at which signals are received in a first period of time from the plurality of client devices by the multiple antennas;
  determining a second set of phase patterns at which the signals are received in a second period of time from the plurality of client devices by the multiple antennas;
  identifying differences between the first and second sets of phase patterns; and
  generating a map or image of the wireless signaling environment based on the differences.

12. The method of claim 11, wherein the plurality of client devices include: at least one client device positioned statically in the wireless signaling environment, and at least one other non-static or semi-static client device, and wherein generating the map or image comprises subtracting phase measurements of any moving client devices in the wireless signaling environment.

13. The method of claim 12 further comprising tracking the at least one other non-static or semi-static client device in the wireless signaling environment based on the differences.

14. The method of claim 9, wherein the wireless signaling environment includes a retail store, and wherein the client device is selected from the group comprising: an electronic display device, a label, and a price tag device.

15. The method of claim 9, wherein determining presence or absence of at least one of: movement of the client device, and one or more objects positioned in a transmission path of the signal, comprises determining presence or absence of one or more objects positioned in the transmission path of the signal, the method further comprising determining presence or absence of movement of the one or more objects in the wireless signaling environment.

16. One or more non-transitory computer readable media having program instructions stored thereon which, when executed by a processor, cause a machine to:
  determine a first phase pattern at which a signal is received by multiple antennas of an antenna array at a first time from a client device in a wireless signaling environment;
  determine a second phase pattern at which the signal is received from the client device by the multiple antennas at a second time after the first time;
  identify a difference between the first and second phase patterns; and
  determine, based at least in part on the difference, presence or absence of at least one of:
    movement of the client device, and
    one or more objects positioned in a transmission path of the signal, in the wireless signaling environment.

17. The one or more non-transitory computer readable media of claim 16, wherein when executed by the processor, the program instructions further cause the machine to:
  determine the first phase pattern by measuring phases at which the signal is received at the first time by the multiple antennas; and
  determine the second phase pattern by measuring phases at which the signal is received at the second time by the multiple antennas.

18. The one or more non-transitory computer readable media of claim 16, wherein the wireless signaling environment includes a plurality of client devices, and wherein when executed by the processor, the program instructions further cause the machine to:
  determine a first set of phase patterns at which signals are received in a first period of time from the plurality of client devices by the multiple antennas;
  determine a second set of phase patterns at which the signals are received in a second period of time from the plurality of client devices by the multiple antennas;
  identify differences between the first and second sets of phase patterns; and
  generate a map or image of the wireless signaling environment based on the differences.

19. The one or more non-transitory computer readable media of claim 18, wherein the plurality of client devices include: at least one client device positioned statically in the wireless signaling environment, and at least one other non-static or semi-static client device, and wherein when executed by the processor to generate the map or image, the program instructions further cause the machine to subtract phase measurements of any moving client devices in the wireless signaling environment.

20. The one or more non-transitory computer readable media of claim 19, wherein when executed by the processor, the program instructions further cause the machine to track the at least one other non-static or semi-static client device in the wireless signaling environment based on the differences.

* * * * *

UNITED STATES PATENT AND TRADEMARK OFFICE
CERTIFICATE OF CORRECTION

| | | |
|---|---|---|
| PATENT NO. | : 11,131,745 B2 | Page 1 of 1 |
| APPLICATION NO. | : 16/871229 | |
| DATED | : September 28, 2021 | |
| INVENTOR(S) | : Hatem Ibrahim Zeine | |

It is certified that error appears in the above-identified patent and that said Letters Patent is hereby corrected as shown below:

In the Specification

Column 7, Line 5, delete "(UF)" and insert --(I/F)--

Signed and Sealed this
First Day of November, 2022

Katherine Kelly Vidal
*Director of the United States Patent and Trademark Office*